(12) United States Patent
Verma

(10) Patent No.: US 12,556,133 B2
(45) Date of Patent: Feb. 17, 2026

(54) SOLAR PANEL ASSEMBLY

(71) Applicant: Abhinav S. Verma, Dubai (AE)

(72) Inventor: Abhinav S. Verma, Dubai (AE)

( * ) Notice: Subject to any disclaimer, the term of this patent is extended or adjusted under 35 U.S.C. 154(b) by 0 days.

(21) Appl. No.: 18/744,632

(22) Filed: Jun. 16, 2024

(65) Prior Publication Data

US 2025/0385640 A1   Dec. 18, 2025

(51) Int. Cl.
| | | |
|---|---|---|
| *H02S 30/10* | (2014.01) | |
| *H02S 10/40* | (2014.01) | |
| *H02S 20/30* | (2014.01) | |
| *H02S 30/20* | (2014.01) | |

(52) U.S. Cl.
CPC ............. *H02S 30/10* (2014.12); *H02S 10/40* (2014.12); *H02S 20/30* (2014.12); *H02S 30/20* (2014.12)

(58) Field of Classification Search
CPC ..................... H02S 20/00–32; H02S 30/00–20
USPC .................................................. 136/243–265
See application file for complete search history.

(56) References Cited

U.S. PATENT DOCUMENTS

| | | |
|---|---|---|
| D971,820 S | 12/2022 | Wen |
| D977,414 S | 2/2023 | Wen |
| D978,072 S | 2/2023 | Wen |
| D979,551 S | 2/2023 | Hill et al. |
| D990,415 S | 6/2023 | Zheng |
| D993,162 S | 7/2023 | Wen |
| D998,180 S | 9/2023 | Huang |
| D999,156 S | 9/2023 | Qin |
| D999,157 S | 9/2023 | Liu |
| D1,000,373 S | 10/2023 | Zheng |
| D1,003,597 S | 11/2023 | Sun et al. |
| D1,006,726 S | 12/2023 | Gao et al. |
| D1,007,411 S | 12/2023 | Gao et al. |
| D1,024,923 S | 4/2024 | Verma |

FOREIGN PATENT DOCUMENTS

| | | | | |
|---|---|---|---|---|
| CN | 209104888 U | * | 7/2019 | |
| CN | 112165150 A | * | 1/2021 | ............ H02S 30/20 |
| CN | 214822622 U | * | 11/2021 | |
| CN | 217406477 U | * | 9/2022 | |
| KR | 20160071668 A | * | 6/2016 | ............ B60L 8/003 |

OTHER PUBLICATIONS

CN-112165150-A English (Year: 2021).*
KR-20160071668-A English (Year: 2016).*
CN-214822622-U English (Year: 2021).*

(Continued)

*Primary Examiner* — Bach T Dinh

(74) *Attorney, Agent, or Firm* — Brett A. Schenck

(57) ABSTRACT

An apparatus is provided that includes a solar panel assembly that is mounted on a vehicle. The solar panel assembly includes a housing that includes a top solar panel, bottom cover panel, right and left side frame members, and front and rear side frame members. Front and rear solar panels are inside the housing in a retracted position of the solar panel assembly. The front and rear solar panels movably extend outside the housing to enable the solar cells of the front and rear solar panels to absorb sunlight.

15 Claims, 25 Drawing Sheets

(56) References Cited

OTHER PUBLICATIONS

Solar Panels. (Design - © Questel) orbit.com. [Online PDF compilation of references selected by examiner] 47 pgs. Print Dates Range Oct. 13, 2023-Jan. 1, 27, 2023 [Retrieved Dec. 28, 2023].

120 Watt Solar Panel Monocrystalline. 2023. AIMS Power. https://vvvvw.aimscorp.net/product/120-watt-solar-panel-monocrystalline/.

100 Watt Monocrystalline Solar Panel. Apr. 26, 2021. Harbor Freight. https://vvvvvv.harborfreight.com/100watt-monocrystalline-solar-panel-57325.html.

What to know when buying a portable solar panel. Mar. 23, 2022. Popular Science. https://wvv\N.popsci.com/technology/how-to-choose-solar-panel-charge-laptop/.

\* cited by examiner

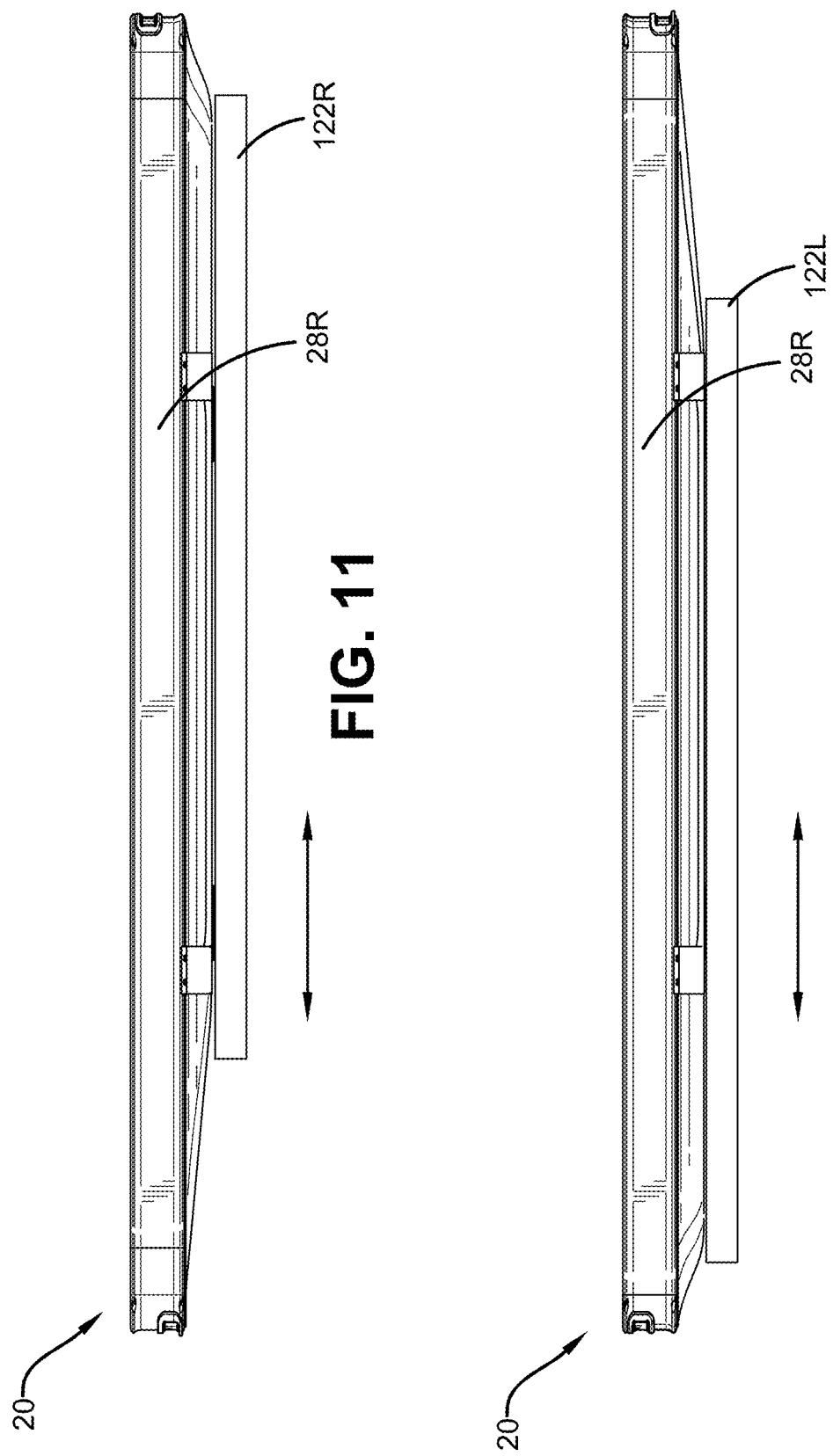

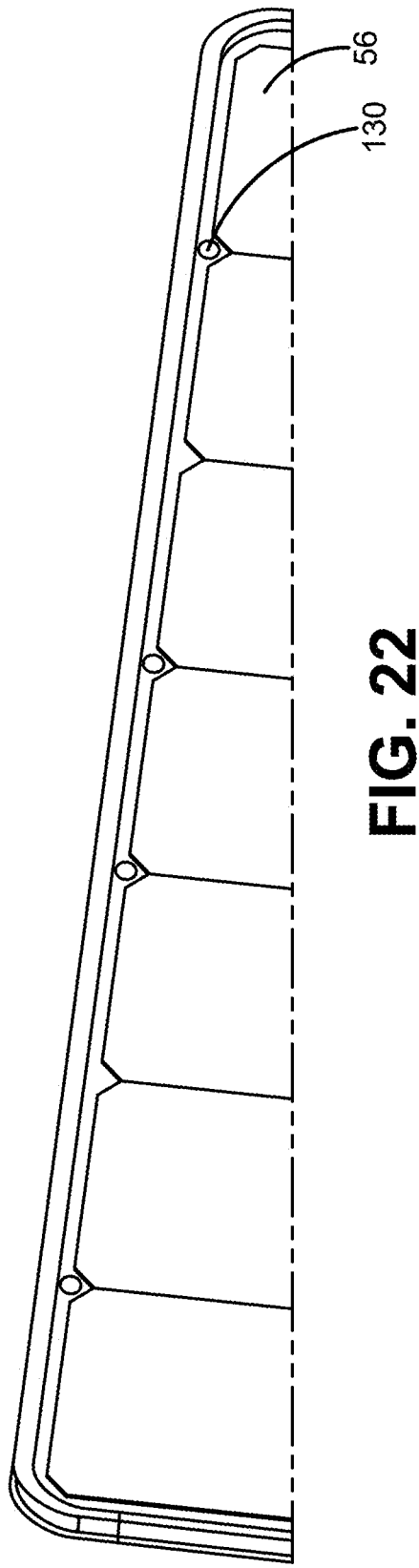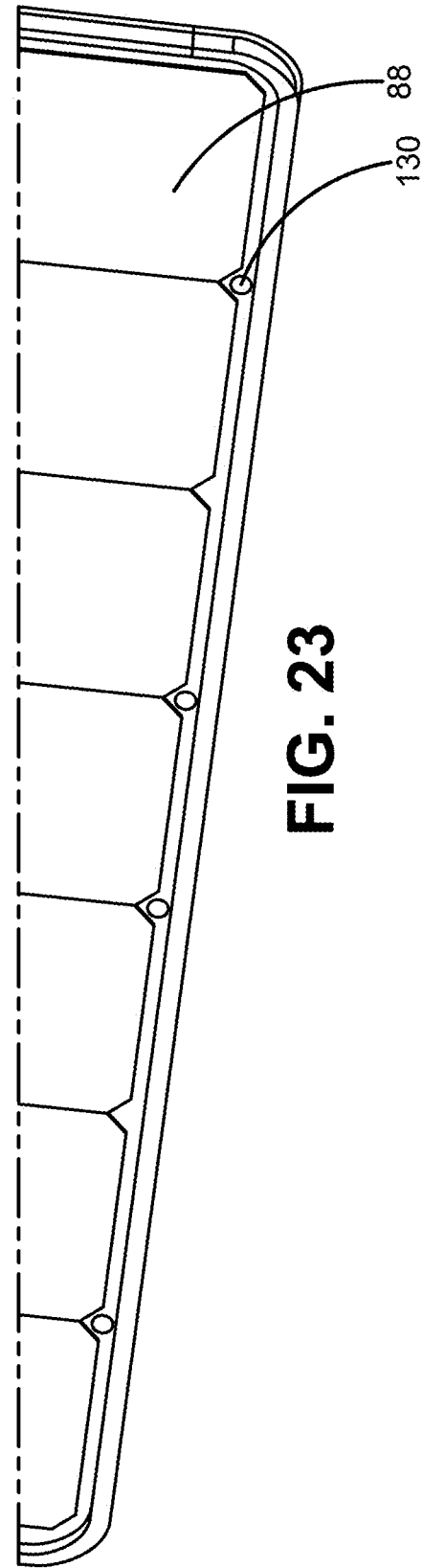

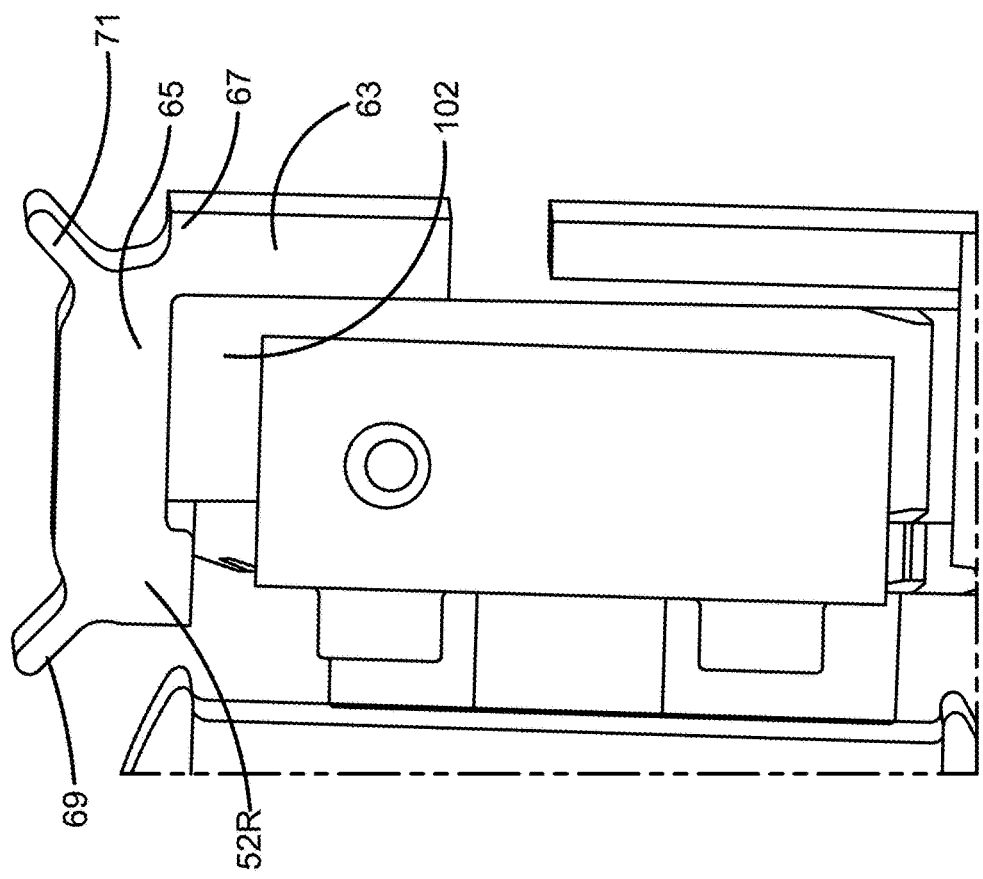
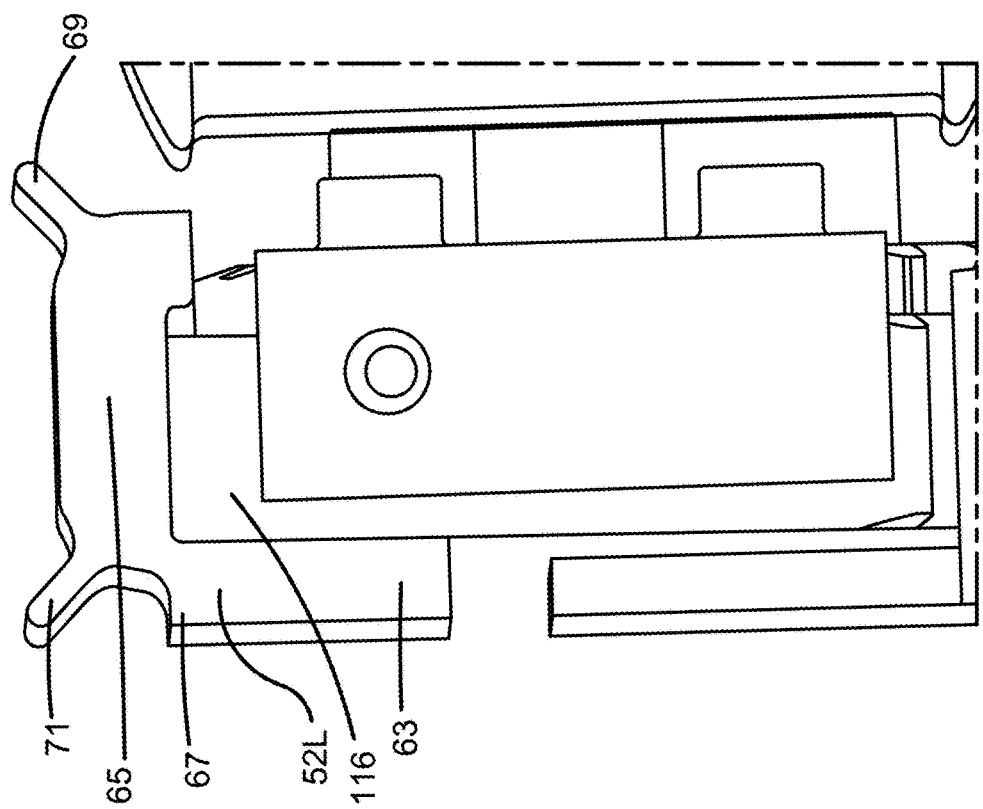

SOLAR PANEL ASSEMBLY

FIELD OF THE INVENTION

This application relates to a solar panel assembly that may be extended and retracted.

BACKGROUND OF THE INVENTION

Solar cells may be used to power electric vehicles from sunlight and are an excellent source of clean energy. Solar vehicles typically contain a rechargeable battery to help regulate and store the energy from the solar cells. The design of solar vehicles always emphasizes energy efficiency to make maximum use of the limited amount of energy they can receive from sunlight. Solar cells may be mounted on the exterior of vehicles so that they are exposed to the sunlight to power them. The larger the surface area of the solar cell exposed to the sunlight, the more power can be supplied to the electric vehicle. However, there is limited room on the exterior of the vehicles for the solar cell. Further, there are locations on the exterior body of the vehicle such as the windows in which placement of the solar cell would obstruct the view through window.

Hence it is an object of the present invention to maximize the supply of solar power to charge a vehicle.

SUMMARY OF THE INVENTION

In one aspect of the present invention, solar panel assembly for a vehicle is provided. The solar panel assembly includes a top solar panel, bottom cover panel, right and left side frame members, and front and rear side frame members. Front and rear solar panels are located inside the housing in a retracted position of the solar panel assembly. The front and rear solar panels movably extend outside the housing to enable the solar cells of the front and rear solar panels to absorb sunlight.

In another aspect of the present invention, an apparatus is provided. The apparatus includes a vehicle. The vehicle has a roof. The solar panel assembly is mounted on the roof of the vehicle. The solar panel assembly includes a housing. The housing includes a top solar panel, a bottom cover panel, first and second opposite side frame members, and third and fourth opposite side frame members. The apparatus further includes a first movable solar panel. The first movable solar panel is movable between a retracted position located inside the housing and an extended position extending from out of the housing.

Other aspects of the disclosed invention will become apparent from the following detailed description, the accompanying drawings and the appended claims.

BRIEF DESCRIPTION OF THE DRAWINGS

The accompanying drawings are included to provide a further understanding of the invention and are incorporated into and constitute a part of the specification. They illustrate one embodiment of the invention and, together with the description, serve to explain the principles of the invention.

FIG. 11 is a right side view of the solar panel assembly of FIG. 1 mounted on a vehicle roof rack.

FIG. 12 is a left side view of the solar panel assembly of FIG. 1 mounted on a vehicle roof rack.

FIG. 22 is a top perspective view of a front portion of the front solar panel of the solar panel assembly of FIG. 1

FIG. 23 is a top perspective view of a rear portion of the rear solar panel of the solar panel assembly of FIG. 1

FIG. 27 is a front view of a left portion of the rear solar panel and other portions of the solar panel assembly of FIG. 1 with portions removed to show a roller bearing in contact with the left upper rail and to show other elements of the solar panel assembly.

FIG. 28 is a front view of a right portion of the rear solar panel and other portions of the solar panel assembly of FIG. 1 with portions removed to show a roller bearing in contact with the right upper rail and to show other elements of the solar panel assembly.

DETAILED DESCRIPTION OF THE INVENTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 1:
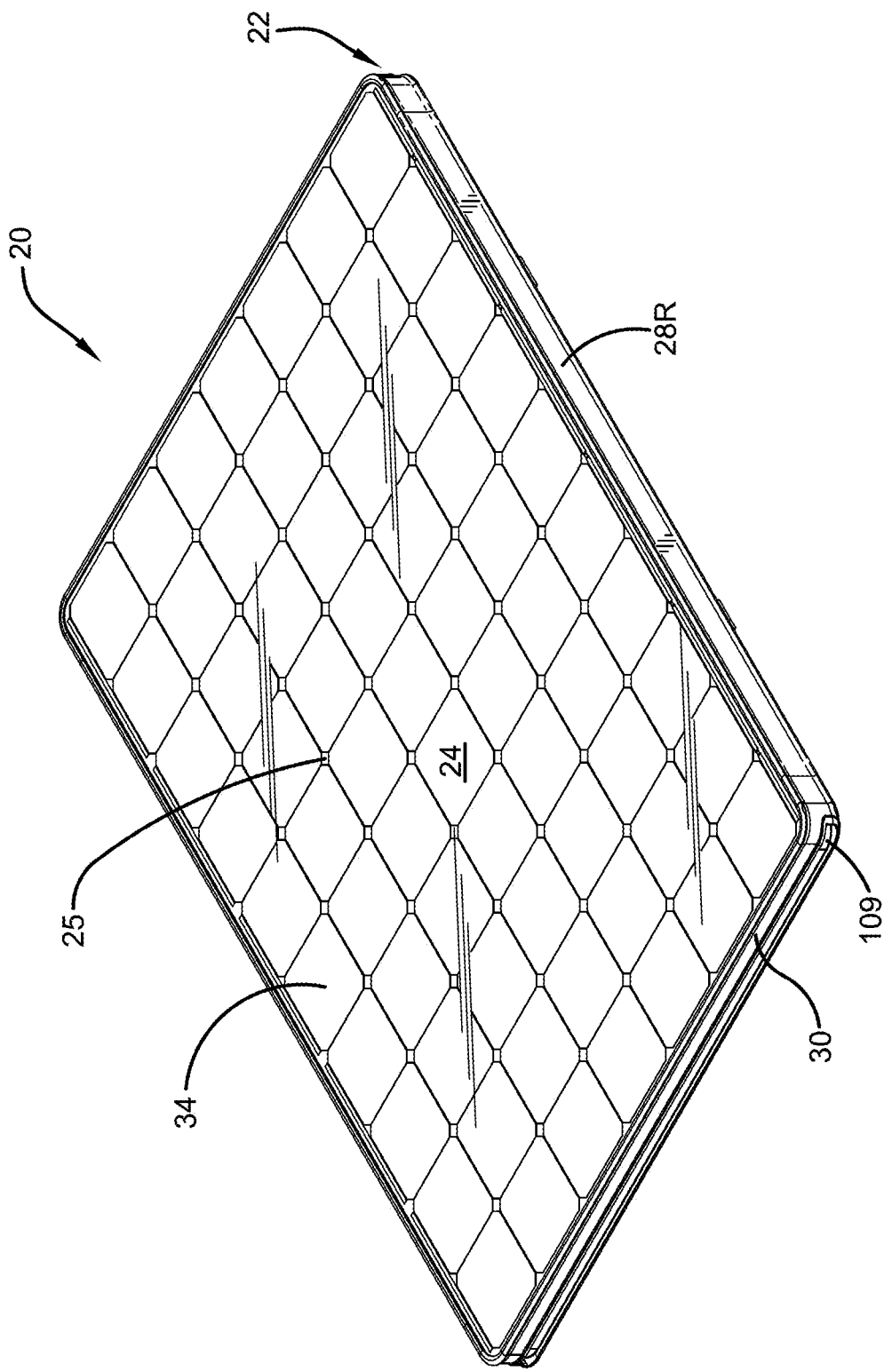
FIG. 1 is a top, front, and right side perspective view of the solar panel assembly in a retracted position according to a first embodiment of the present invention.

Throughout the present description, the terms "upper", "lower", "top", "bottom", "left", "right", "front", "forward", "rear", and "rearward" shall define directions or orientations with respect to the apparatus as illustrated in FIG. 1, a top, front, and right side perspective view of the solar panel assembly in a retracted position. It will be understood that the spatially relative terms "upper", "lower", "top", "bottom", "left", "right", "front", "forward", "rear", and "rearward" are intended to encompass different orientations of the apparatus in use or operation in addition to the orientation depicted in the figures. For example, if the apparatus in the figures is turned over, elements described as "upper" elements or features would then be "lower" elements or features.

Figure 2:
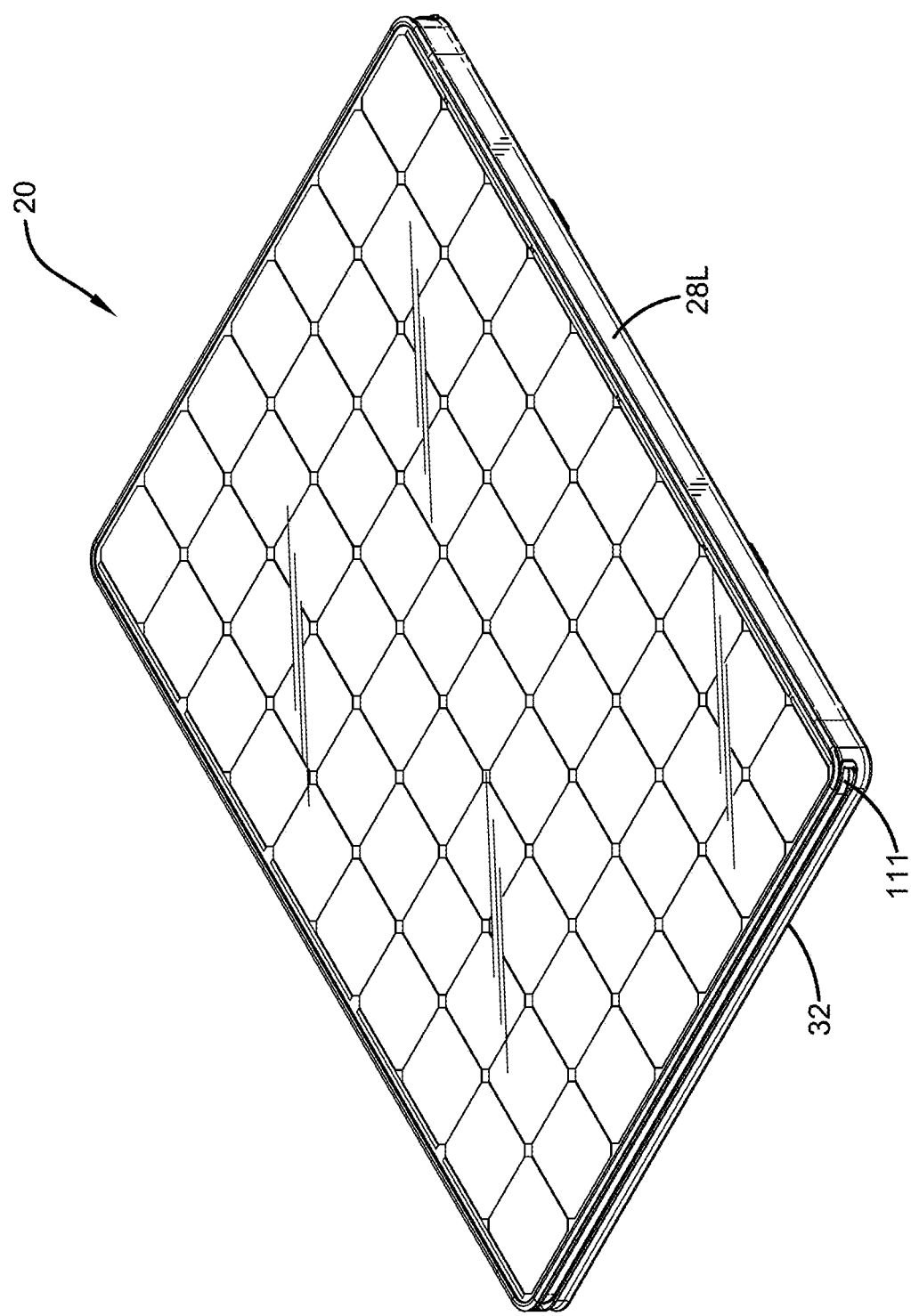
FIG. 2 a top, rear, and left side perspective view of the solar panel assembly of FIG. 1.

FIGS. 1 and 2 show a first embodiment of a solar panel assembly 20 in the retracted position. The solar panel assembly 20 comprises a main housing 22. The main housing 22 includes a top solar panel 24, bottom cover panel 26 (FIG. 3), right and left side frame members 28R, 28L, and front and rear side frame members 30, 32. The top solar panel 24 may be rectangular in shape and include a center body 25 that has solar cells 34 on top of the body 25. A top solar panel frame 36 (FIG. 4) surrounds the peripheral end of the body 25 and is attached to body 25.

Figure 4:
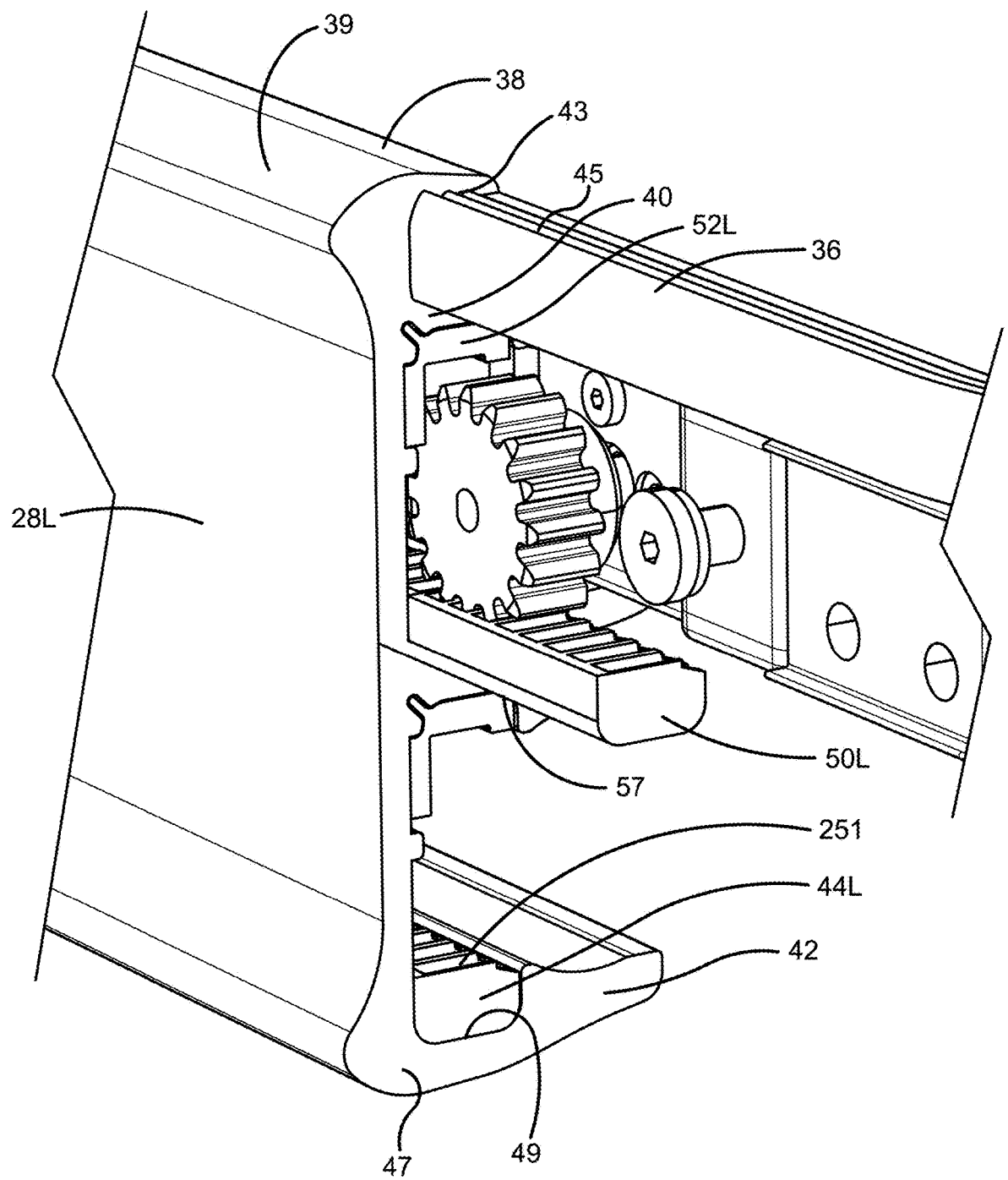
FIG. 4 is a top, front, and left side perspective view of a portion of the solar panel assembly of FIG. 1 with the front frame member and other portions removed for illustrative purposes.
Figure 5:
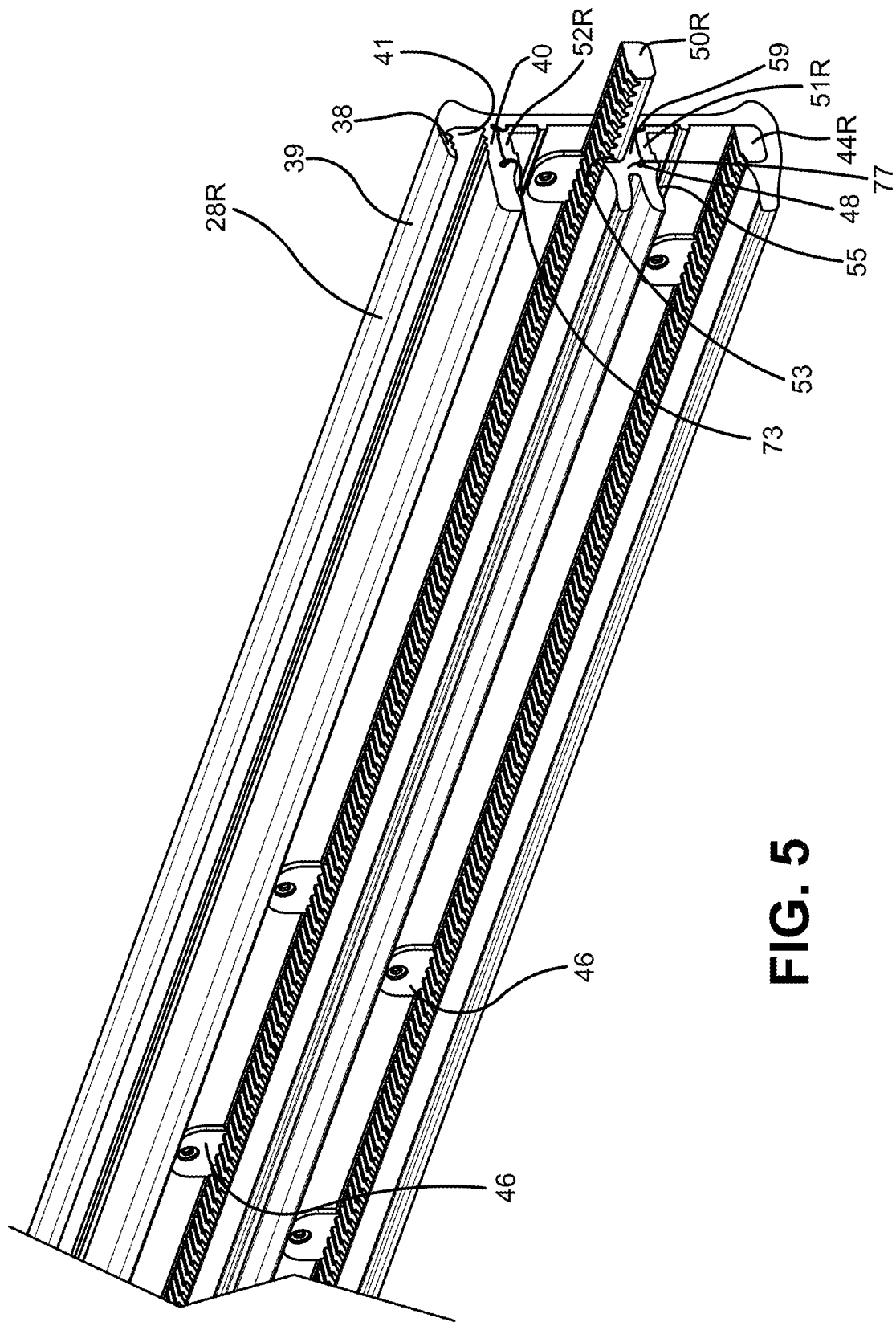
FIG. 5 is a top and left perspective view of a portion of the solar panel assembly of FIG. 1 with portions removed to show the right frame member, right upper and lower rails, and the right upper and lower racks.

As illustrated in FIGS. 4 and 5, each of the right and left side frame members 28R, 28L includes upper and lower lips 38, 40 formed on a top end 39 of the side frame member that extend inwardly. The upper and lower lips 38, 40 define a channel 41 (FIG. 5) that securely receives the top solar panel frame 36. As depicted in FIG. 4, the upper lip 38 includes ribs 43 on its underside that depend downwardly and engage corresponding grooves 45 formed in the top surface of the top solar frame 36. Each of the right and left side frame members 28R, 29L includes a bottom end 47 in which a bottom lip 42 is attached thereto and extends inwardly from the bottom end 47. The bottom lip 42 includes a lower rack channel 49 that extends longitudinally (front to back) along the respective right or left side frame member. A right lower rack 44R (FIG. 5) is inserted into the lower rack channel 49 for the right side frame member 28R, and a left lower rack 44L is inserted into the lower rack channel 49 for the left side frame member 28L. The right and left lower racks 44R, 44L extend longitudinally along their respective lower rack channels 49. Each of the right and left lower racks 44R, 44L includes teeth 251 formed in its top surface. Each of the lower racks includes upper mounting tabs 46 (FIG. 5) that enable the lower rack to be mounted by fasteners to its respective left or right side frame member. Each of the right and left side frame members 28R, 28L also includes a medial holder 48 that is attached at approximately the midpoint between the top and bottom ends 39, 47. The medial holder 48 includes a body 59 and upper and lower holder lips 53, 55 (FIG. 5).

The medial holder 48 extends inwardly and includes an upper rack channel 57 (FIG. 4) in the top surface of its body 59 (FIG. 5) that extends longitudinally (front to back) along the side frame member. A right upper rack 50R is inserted into the upper rack channel 57 for the right side frame member 28R, and a left upper rack 50L is inserted into the upper rack channel 57 for the left side frame member 28L. The right and left upper racks 50R, 50L extend longitudinally along their respective upper rack channels 57. Each of the right and left upper racks 50R, 50L includes teeth 61 formed in its top surface. The upper and lower racks include upper mounting tabs 46 (FIG. 5) that enable the upper and lower racks to be mounted by bolts to the left or right side frame member.

Figure 26:
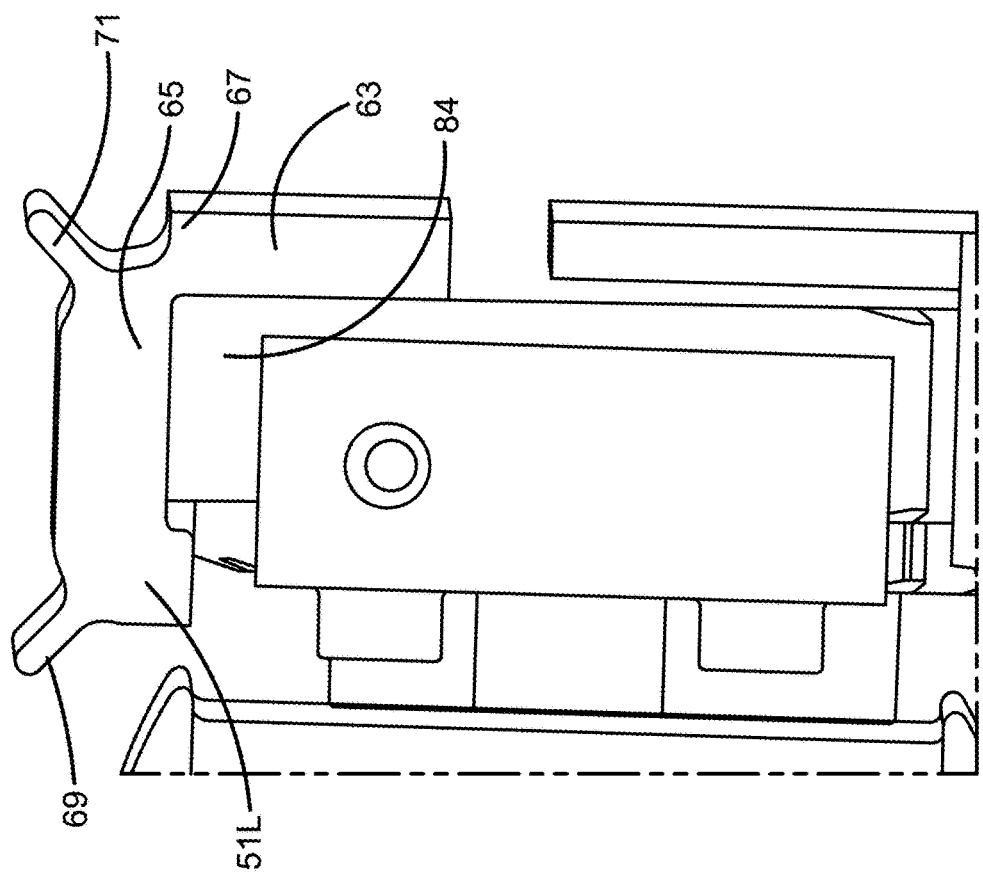
FIG. 26 is a rear view of a left portion of the front solar panel and other portions of the solar panel assembly of FIG. 1 with portions removed to show a roller bearing in contact with the left lower rail and to show other elements of the solar panel assembly.
Figure 25:
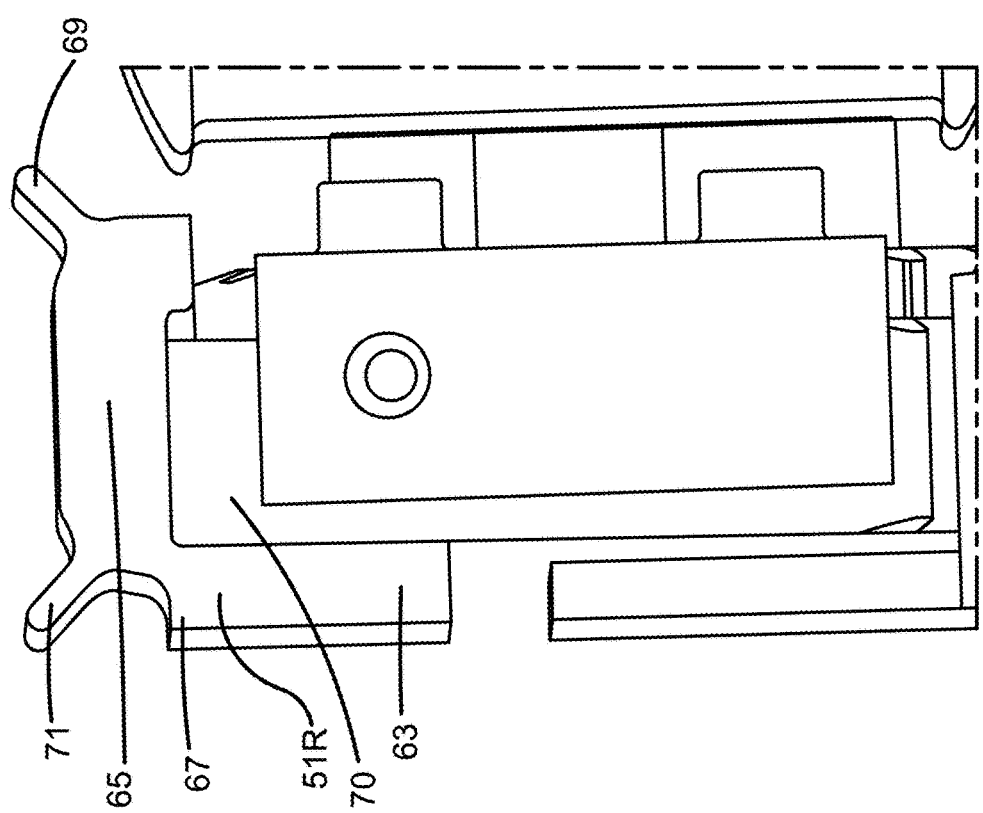
FIG. 25 is a rear view of a right portion of the front solar panel and other portions of the solar panel assembly of FIG. 1 with portions removed to show a roller bearing in contact with the right lower rail and to show other elements of the solar panel assembly.

As illustrated in FIGS. 4, 5, 14, 15, 25, and 26, the solar panel assembly 20 further includes a pair of inverted L-shaped right and left lower rails 51R, 51L that are each attached to their respective right and left side frame member by bolts. As depicted in FIGS. 25 and 26, each lower rail includes a lower vertical leg 63 integrally formed in one piece with an upper horizontal leg 65 at an upper end 67 of the lower leg 63. The upper leg 65 extends inwardly from the upper end 67 of the lower leg 63. The upper leg 65 also includes a pair of inner and outer arms 69, 71 that extend diagonally and upwardly from the upper leg 65. The inner arm 69 extends upwardly and inwardly, and the outer arm 71 extends upwardly and outwardly relative to the solar panel assembly 20. The arms 69, 71 are inserted into corresponding arm channels 77 (FIG. 5) formed in the bottom side of the body 59 of the medial holder 48.

Figure 3:
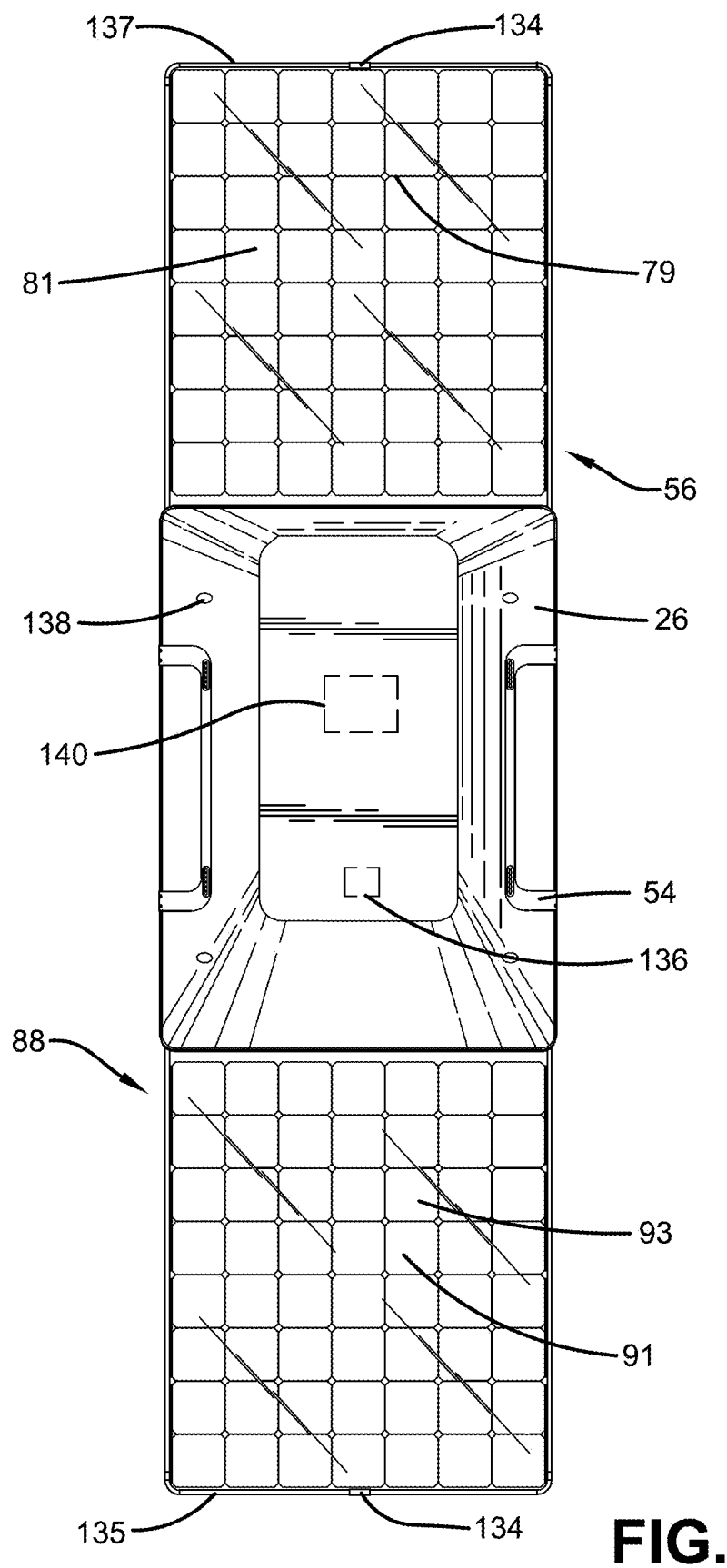
FIG. 3 a bottom view of the solar panel assembly of FIG. 1 in an extended position.

As illustrated in FIGS. 4, 5, 14, 15, 27, and 28, the solar panel assembly 20 further includes a pair of inverted L-shaped right and left upper rails 52R, 52L that are each attached to their respective right and left side frame member by bolts. As depicted in FIGS. 27 and 28, similar to each lower rail, each upper rail includes a lower vertical leg 63 integrally formed on one piece with an upper horizontal leg 65 at an upper end 67 of the lower leg 63. The upper leg 65 extends inwardly from the upper end of the lower leg. The upper leg 65 also includes a pair of inner and outer arms 69, 71 that extend diagonally and upwardly from the upper leg 65. The inner arm 69 extends upwardly and inwardly and the outer arm 71 extends upwardly and outwardly relative to the solar panel assembly 20. The arms 69, 71 are inserted into corresponding arm channels 73 (FIG. 5) formed in the bottom side of the lower lip 38 located at the top end of the side frame member. The bottom cover panel 26 is attached to the bottom of the right and left side frame members via brackets 54 (FIG. 3). The bottom cover panel 26 is waterproof to protect the solar panel assembly from water. Alternatively, or in addition, the bottom cover panel may include drain holes 138 (FIG. 3) and all electric components such as the inverter electrically insulated in a waterproof housing.

Figure 6:
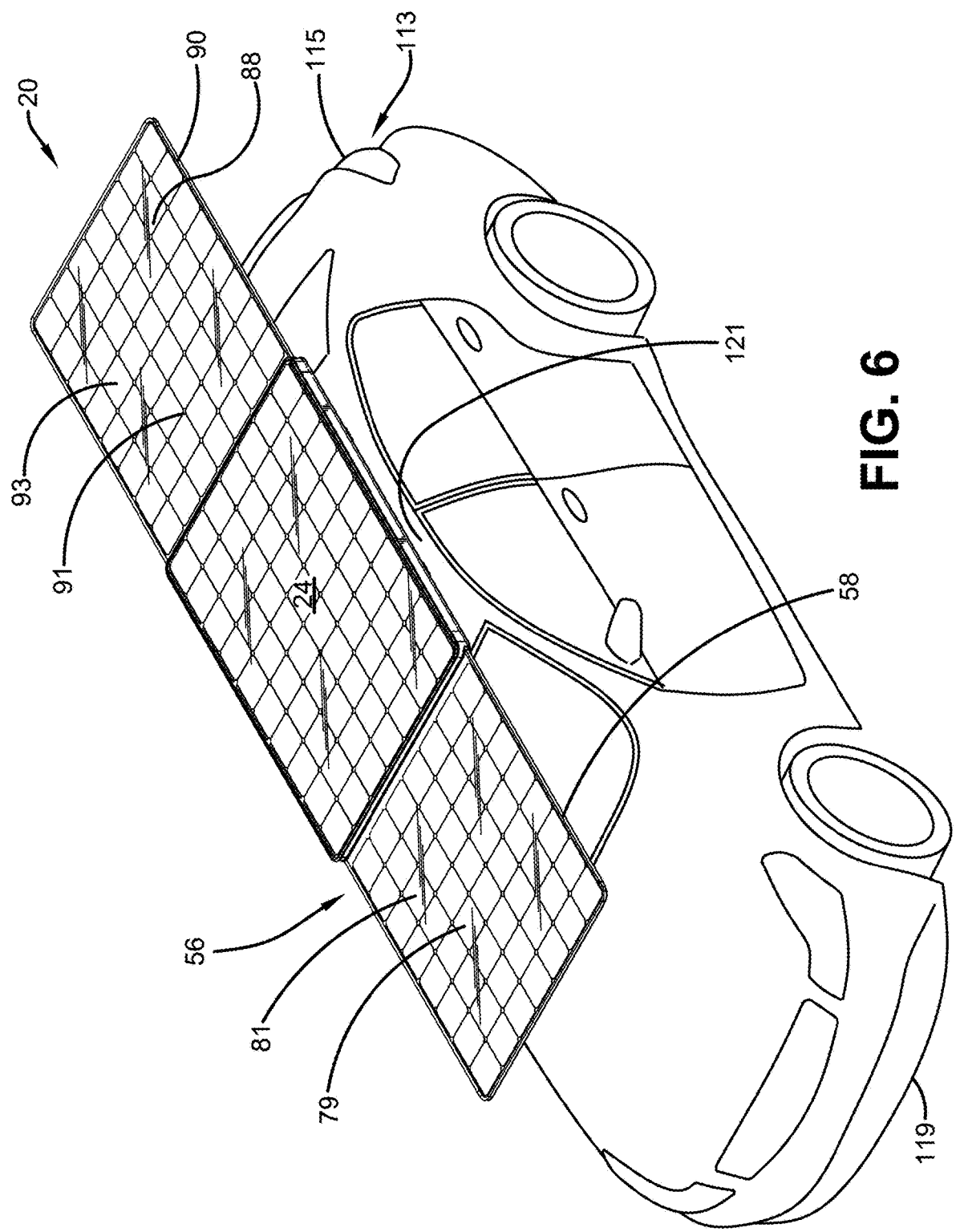
FIG. 6 is a top, front, and right perspective view of the solar panel assembly of FIG. 1 mounted on a vehicle in the extended position.
Figure 7:
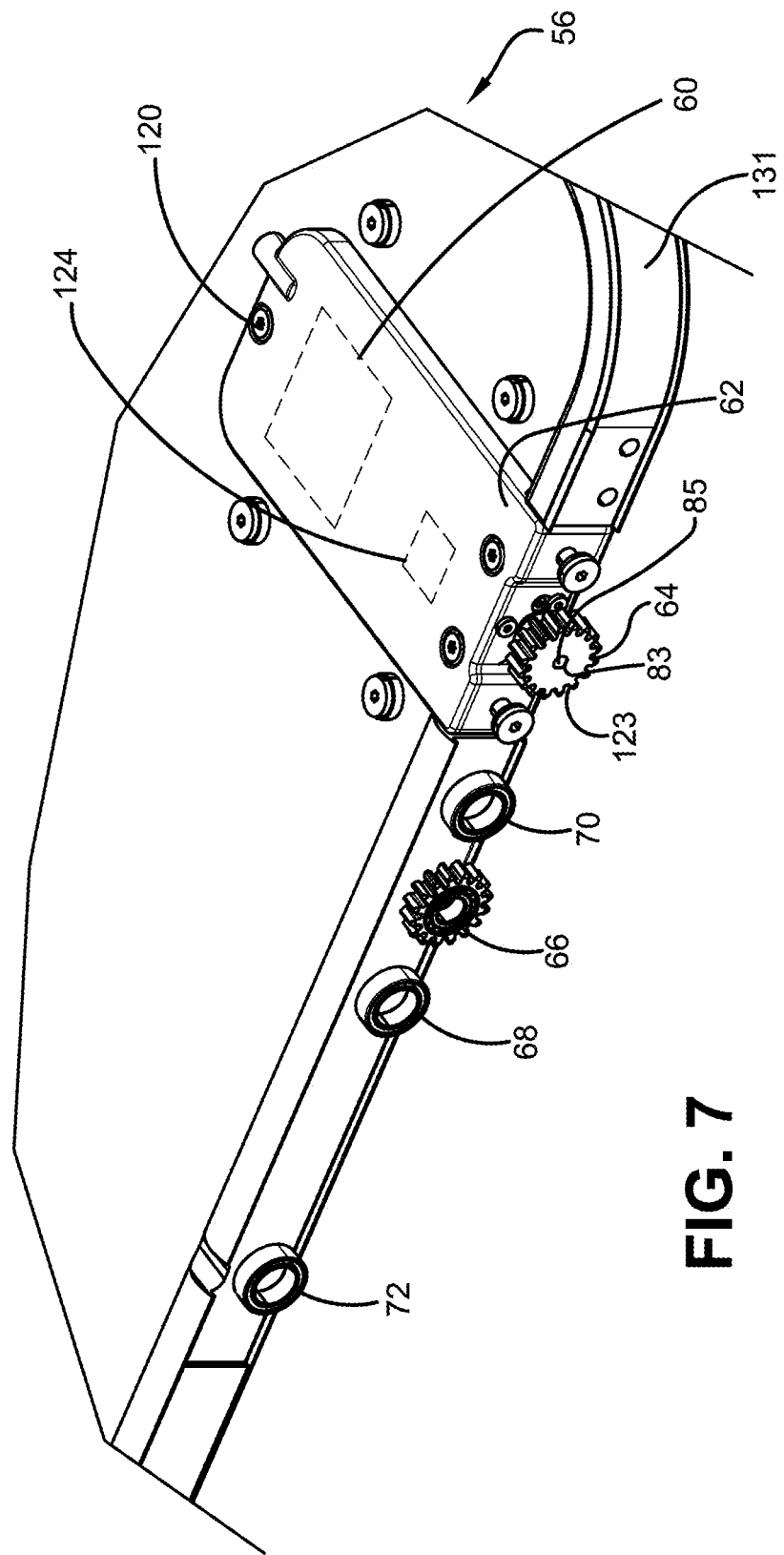
FIG. 7 is a top, rear, and right side view of a portion of the front solar panel and related parts of the solar panel assembly of FIG. 1 illustrating the mechanism that extends and retracts the front solar panel.

The solar panel assembly 20 also includes a front solar panel 56 as illustrated in FIGS. 3 and 6. The front solar panel 56 includes a body 79 that has solar cells 81 on both the top and bottom surface of the front solar panel 56. The front solar panel 56 includes a front solar panel frame 58 that surrounds the peripheral end of the body 79 and is attached to the body 79. As seen in FIG. 7, a first motor 60 is mounted in a first motor compartment 62 of the front solar panel frame 58 near the rear right corner of the front solar panel frame 58. The first motor 60 may be powered by a power source such as the vehicle battery or a small rechargeable battery 142 (FIG. 20) in the front solar panel 56. The battery 142 may be charged by the front solar panel 56. The first motor 60 includes a rotor or shaft 83 that is D-shaped in cross section. The rotor 83 of the first motor 60 extends through the first motor compartment 62, the right side of the front solar panel frame 58 and through a corresponding D-shaped bore 85 of a first pinion gear 64. The rotor 83 engages the first pinion gear, so that rotation of the rotor rotates the first pinion gear 64. A first roller bearing gear 66 is rotatably mounted to the right side of the front solar panel frame 58 and rotates freely. The first roller bearing gear 66 is located between first and second roller bearings 68, 70 located on the right side of the front solar panel frame. A third roller bearing 72 is located forwardly from the first roller bearing gear 66 and first roller bearing 68. The first, second, and third roller bearings are rotatably mounted on the exterior side of the front solar panel frame 58 with the rotating axes of the roller bearings being located higher than the axis of rotation of the first roller bearing gear 66, such that the highest points of the roller bearings 68, 70, 72 are higher than the highest point of the first roller bearing gear 66.

Figure 8:
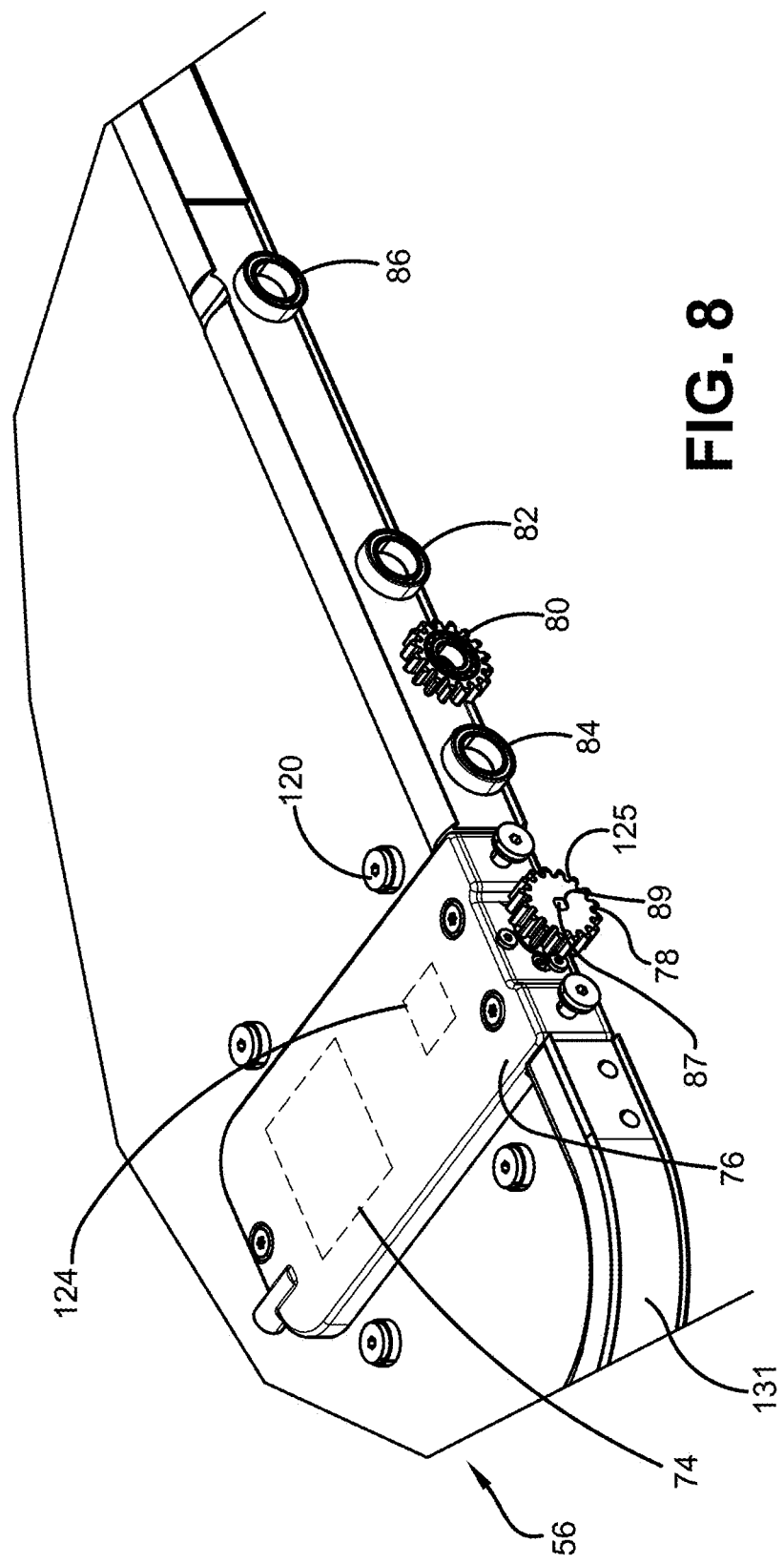
FIG. 8 is a top, rear, and left side view of a portion of the front solar panel and related parts of the solar panel assembly of FIG. 1 illustrating the mechanism that extends and retracts the front solar panel.
Figure 20:
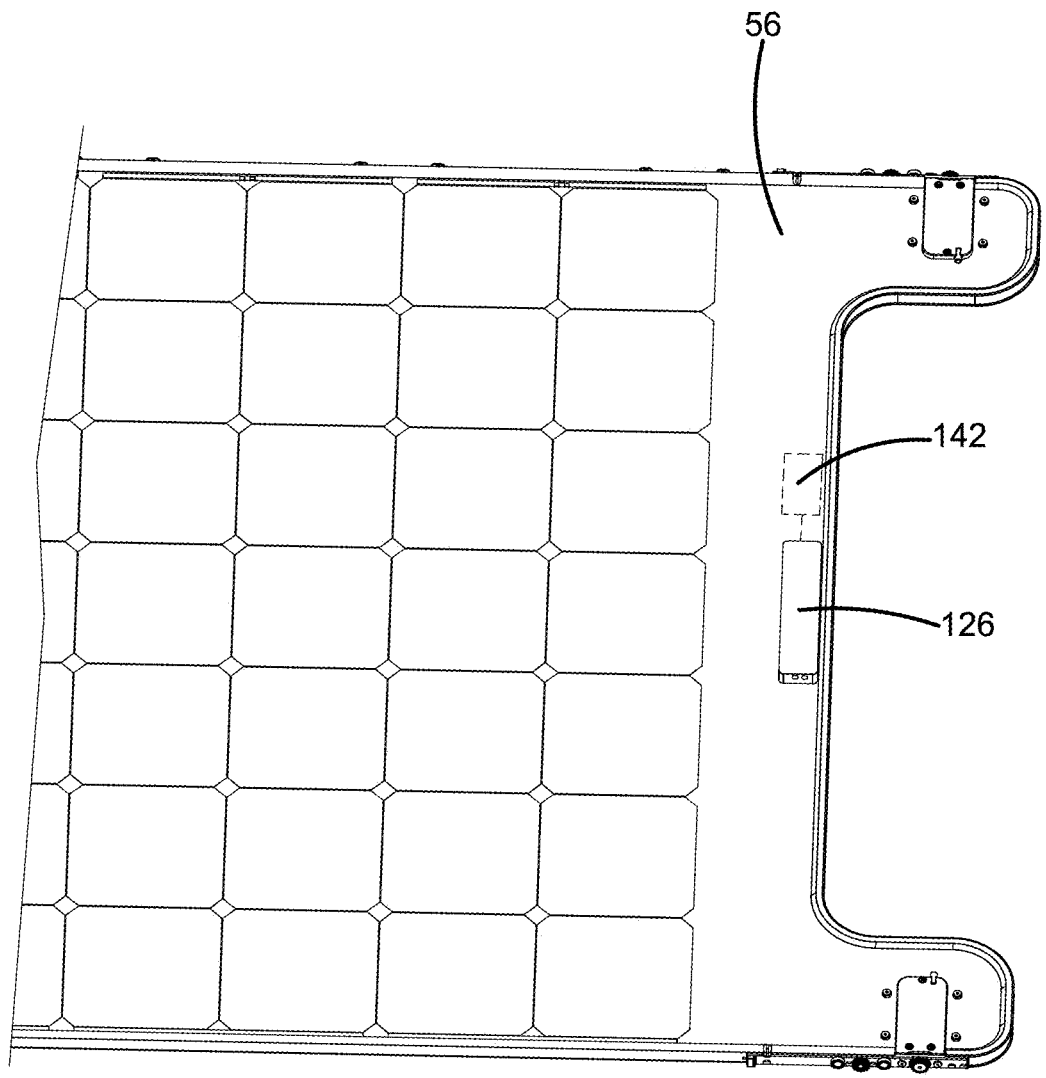
FIG. 20 is a top and right side perspective view of a rear portion of the front solar panel of the solar panel assembly of FIG. 1.

As illustrated in FIG. 8, a second motor 74 is mounted in a second motor compartment 76 of the front solar panel frame 58 near the rear left corner of the front solar panel frame 58. The second motor 74 may be powered by a power source such as the vehicle battery or the small rechargeable battery 142 (FIG. 20). The second motor 74 includes a rotor or shaft 87 that is D-shaped in cross section. The rotor 87 of the second motor 74 extends through the second motor compartment 76, the left side of the front solar panel frame 58 and through a corresponding D-shaped bore 89 of a second pinion gear 78. The rotor 87 engages the second pinon gear 78, so that rotation of the rotor 87 rotates the second pinion gear 78. A second roller bearing gear 80 is rotatably mounted to the left side of the front solar panel frame 58 and rotates freely. The second roller bearing gear 80 is located between fourth and fifth roller bearings 82, 84 located on the left side of the front solar panel frame 58. A sixth roller bearing 86 is located forwardly from the second roller bearing gear 80 and fourth roller bearing 82. The fourth, fifth, and sixth roller bearings are rotatably mounted on the exterior side of the front solar panel frame 58 with the rotating axes of the roller bearings being located higher than the axis of rotation of the second roller bearing gear, such that the highest points of the roller bearings 82, 84, 86 are higher than the highest point of the second roller bearing gear 80.

Figure 9:
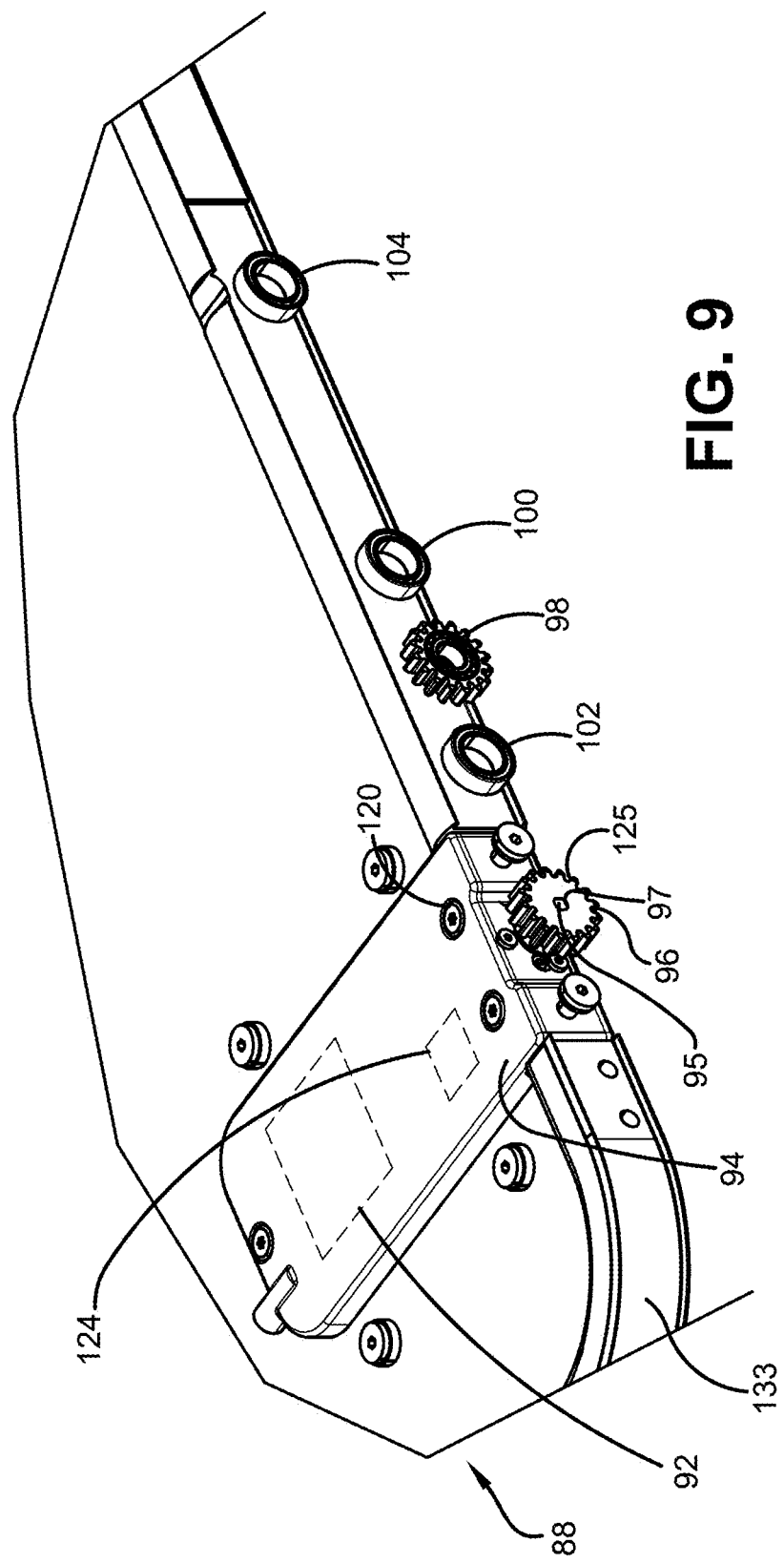
FIG. 9 is a top, front, and right side view of a portion of the rear solar panel and related parts of the solar panel assembly of FIG. 1 illustrating the mechanism that extends and retracts the rear solar panel.

The solar panel assembly 20 also includes a rear solar panel 88 as seen in FIGS. 3 and 6. The rear solar panel 88 includes include a body 91 that has solar cells 93 on both the top and bottom surface of the rear solar panel 88. The rear solar panel 88 includes a rear solar panel frame 90 that surrounds the peripheral end of the body 91 and is attached to body 91. As illustrated in FIG. 9, a third motor 92 is mounted in a third motor compartment 94 of the rear solar panel frame 90 near the front right corner of the rear solar panel frame 90. The third motor 92 may be powered by a power source such as the vehicle battery or a small rechargeable battery 144 (FIG. 21) in the rear solar panel 88. The rechargeable battery 144 may be charged by the rear solar panel 88. The third motor 92 includes a rotor or shaft 95 that is D-shaped in cross section. The rotor 95 of the third motor 92 extends through the third motor compartment 94, the right side of the rear solar panel frame 90 and through a corresponding D-shaped bore 97 of a third pinion gear 96. The rotor engages the third pinon gear 96, so that rotation of the rotor rotates the third pinion gear 96. A third roller bearing gear 98 is rotatably mounted to the right side of the rear solar panel frame 90 and rotates freely. The third roller bearing gear 98 is located between seventh and eighth roller bearings 100, 102 located on the right side of the rear solar panel frame 90. A ninth roller bearing 104 is located rearwardly from the third roller bearing gear 98 and seventh roller bearing 100. The seventh, eighth, and ninth roller bearings 100, 102, 104 are rotatably mounted on the exterior side of the rear solar panel frame 90 with the rotating axes of the roller bearings 100, 102, 104 being located higher than the axis of rotation of the third roller bearing gear 98, such that the highest points of the roller bearings 100, 102, 104 are higher than the highest point of the third roller bearing gear 98.

Figure 10:
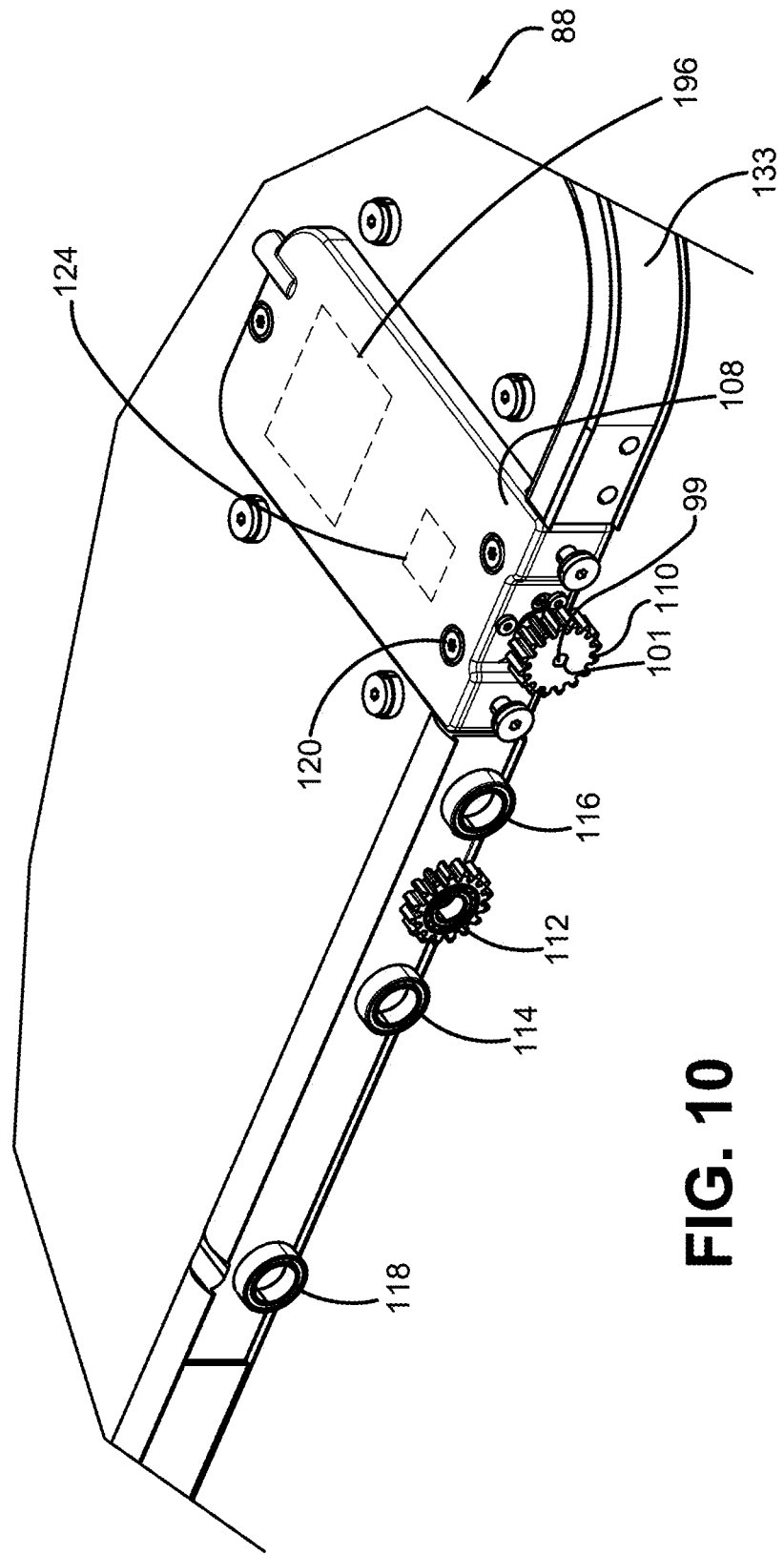
FIG. 10 is a top, front, and left side view of a portion of the rear solar panel and related parts of the solar panel assembly of FIG. 1 illustrating the mechanism that extends and retracts the rear solar panel.

As illustrated in FIG. 10, a fourth motor 106 is mounted in a fourth motor compartment 108 of the rear solar panel frame 90 near the front left corner of the rear solar panel frame 90. The fourth motor 106 may be powered by a power source such as the vehicle battery or the rechargeable battery 144. The fourth motor 106 includes a rotor or shaft 99 that is D-shaped in cross section. The rotor 99 of the fourth motor 106 extends through the fourth motor compartment 108, the left side of the rear solar panel frame 90 and through a corresponding D-shaped bore 101 of a fourth pinion gear 110. The rotor 99 engages the fourth pinon gear 110, so that rotation of the rotor 99 rotates the fourth pinion gear 110. A fourth roller bearing gear 112 is rotatably mounted to the left side of the rear solar panel frame 90 and rotates freely. The fourth roller bearing gear 112 is located between tenth and eleventh roller bearings 114, 116 located on the left side of the rear solar panel frame 90. A twelfth roller bearing 118 is located rearwardly from the fourth roller bearing gear 112 and the tenth roller bearing 114. The tenth, eleventh, and twelfth roller bearings 114, 116, 118 are rotatably mounted on the exterior side of the rear solar panel frame 90 with the rotating axes of the roller bearings being located higher than the axis of rotation of the fourth roller bearing gear 112, such that the highest points of the roller bearings 100, 102, 104 are higher than the highest point of the fourth roller bearing gear 112. Each of the motor compartments may be covered by a cover fastened thereto by suitable fasteners such as hex-shaped recess head screws 120.

Figure 13:
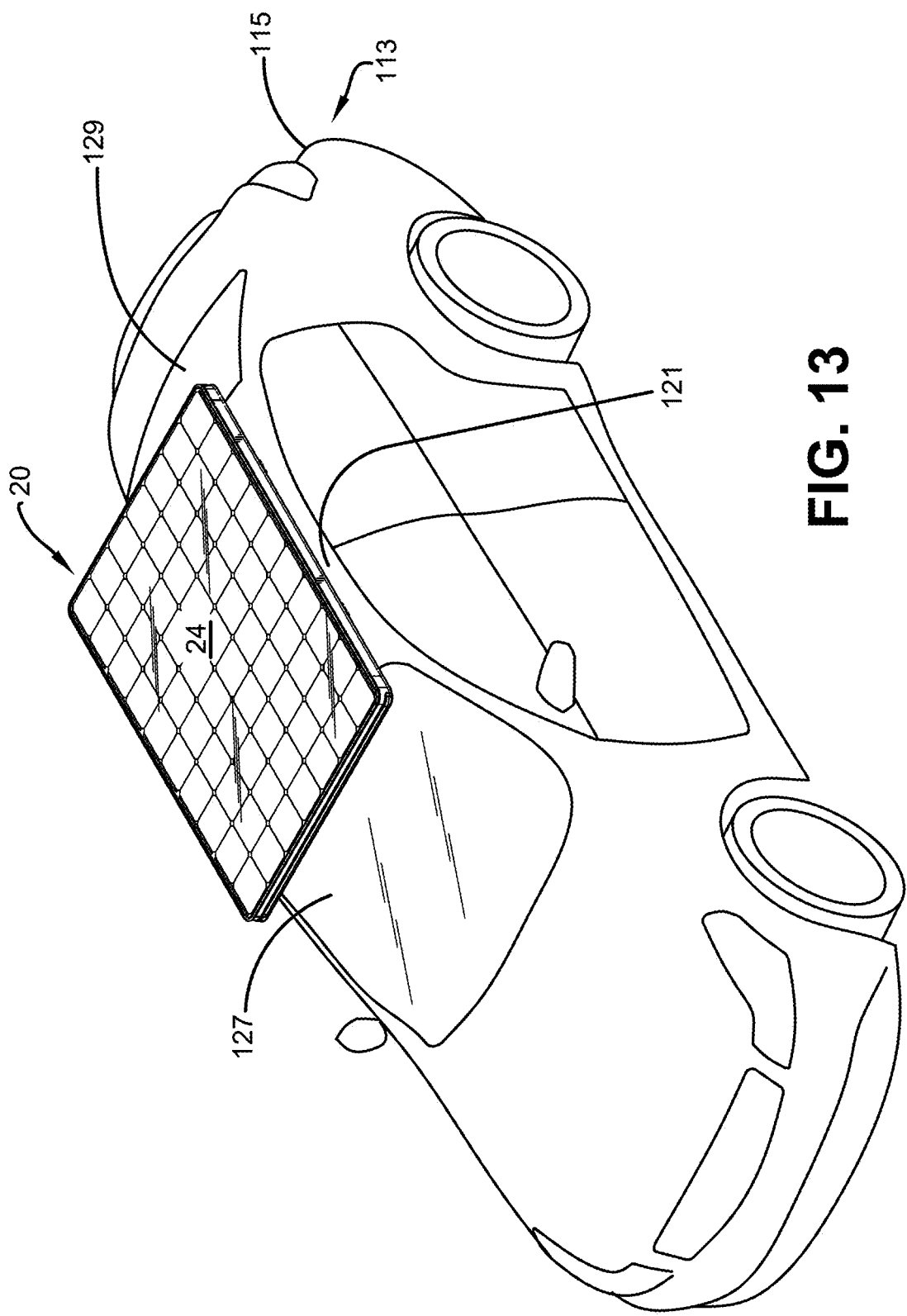
FIG. 13 is a is a top, front, and right perspective view of the solar panel assembly of FIG. 1 mounted on a vehicle in a retracted position.
Figure 14:
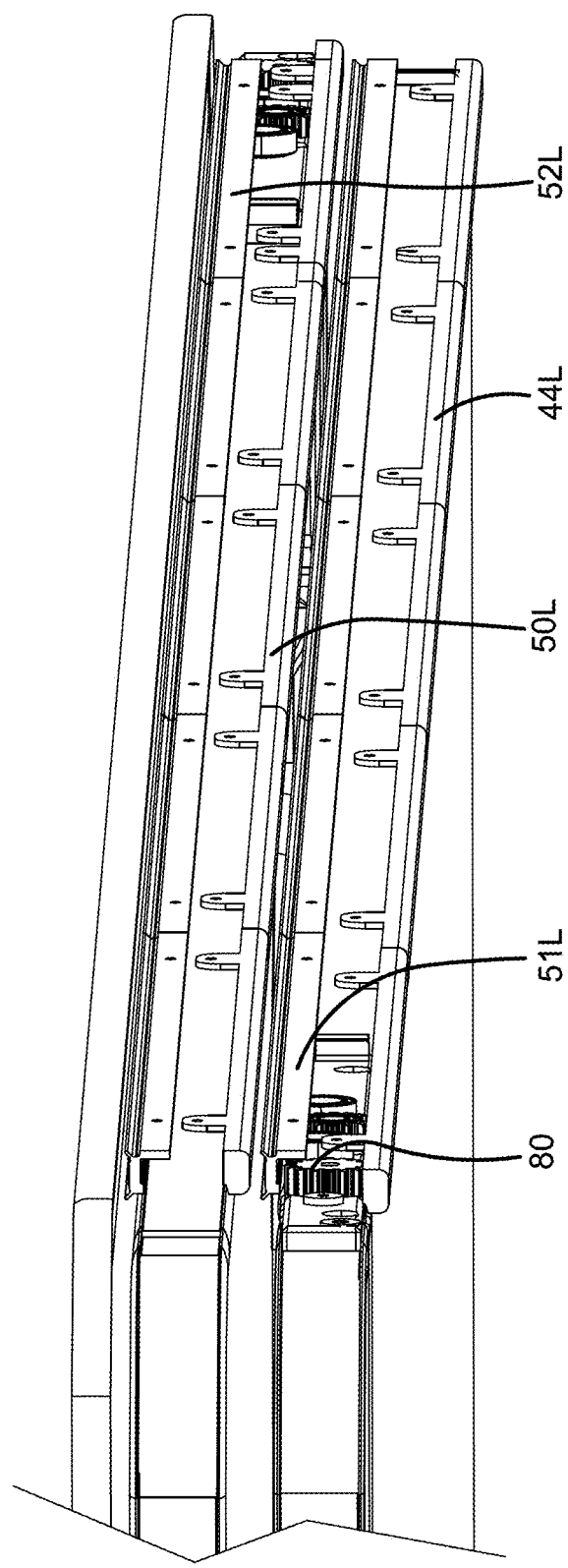
FIG. 14 is a rear and left side perspective view of a portion of the solar panel assembly of FIG. 1 in the retracted position with the left side frame member removed for illustrative purposes.
Figure 15:
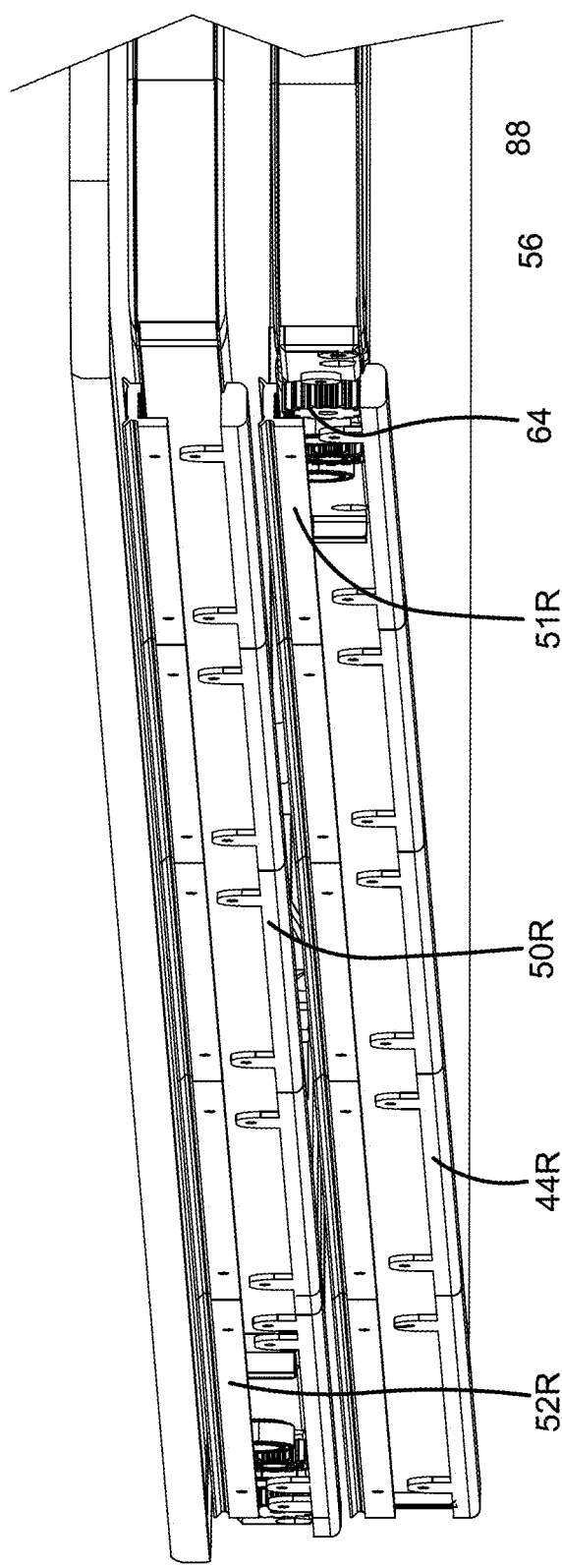
FIG. 15 is a rear and right side perspective view of a portion of the solar panel assembly of FIG. 1 in the retracted position with the right side frame member removed for illustrative purposes.
Figure 16:
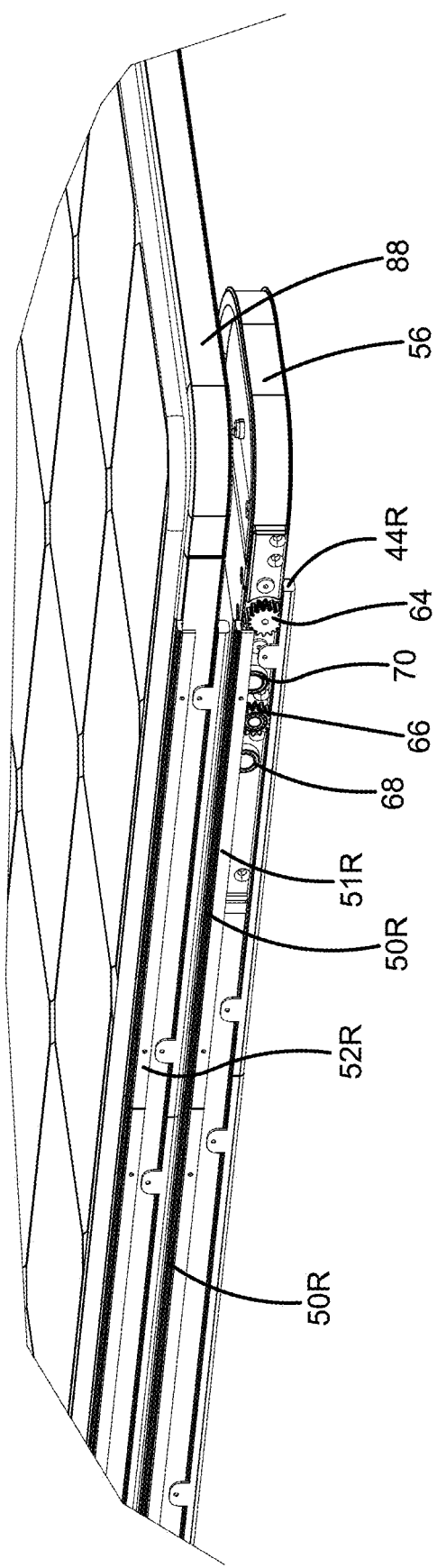
FIG. 16 is a rear and right side perspective view of a portion of the solar panel assembly of FIG. 1 in the retracted position with the right side frame member removed for illustrative purposes.
Figure 17:
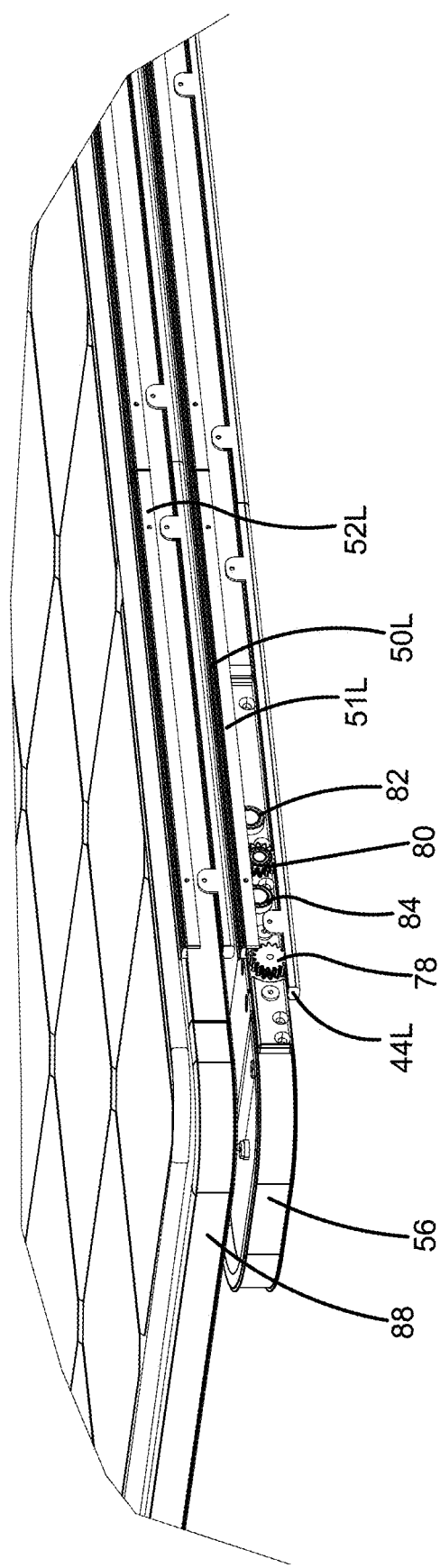
FIG. 17 is a rear and left side perspective view of a portion of the solar panel assembly of FIG. 1 in the retracted position with the left side frame member removed for illustrative purposes.

The front and rear side frame members 30, 32 are attached to the right and left side frame members 28R, 28L. The front side frame member 30 has a lower opening 109 (FIG. 1) and the rear side frame member 32 has an upper opening 111 (FIG. 2). The solar panel assembly 20 may be mounted on the vehicle roof in any way including but not limited to cross bars, vacuum suction cups, welding, and with bolts. In one example, the solar panel assembly may be mounted to right and left roof racks 122R, 122L mounted on a vehicle 113 (FIG. 6) as shown in FIGS. 11 and 12. The solar panel assembly 20 may be slidably mounted to the right and left roof racks 122R, 122L or otherwise slidably mounted on a roof 121 (FIG. 6) of the vehicle 113. This enables the solar panel assembly 20 to slide forwardly when mounted on the vehicle 113 so that the rear solar panel 90 does not rearwardly extend beyond a rear portion 115 (FIG. 6) of the vehicle 113, since the rear portion 115 of the vehicle 113 is shorter in length than a front portion 119 (FIG. 6) of the vehicle 113. The solar panel assembly 20 may be removeable mounted to the roof 121 in a manner that makes removal of the solar panel assembly 20 from the roof easy. This may be desirable if a user plans a long road trip with the electric vehicle and wants to easily remove the solar panel assembly 20 to improve vehicle aerodynamics and reduce the weight of the vehicle. FIG. 13 shows the solar panel assembly 20 mounted on the roof 121 of the electric vehicle 113 in the retracted position.

Referring to FIGS. 13-17, in the retracted position, the front solar panel 56 is inside the housing 22 with teeth 123 (FIG. 7) of the first pinion gear 64 and the first roller bearing gear 66 in meshing engagement with the teeth 251 (FIG. 4) of the right lower rack 44R, and teeth 125 (FIG. 8) of the second pinion gear 78 and the second roller bearing gear 80 in meshing engagement with the teeth 251 of the left lower rack 44L. In this retracted position also, the first, second, and third roller bearings 68, 70, 72 contact the right lower rail 51R and the fourth, fifth, and sixth roller bearings 82, 84, 86 contact the left lower rail 51L.

Figure 18:
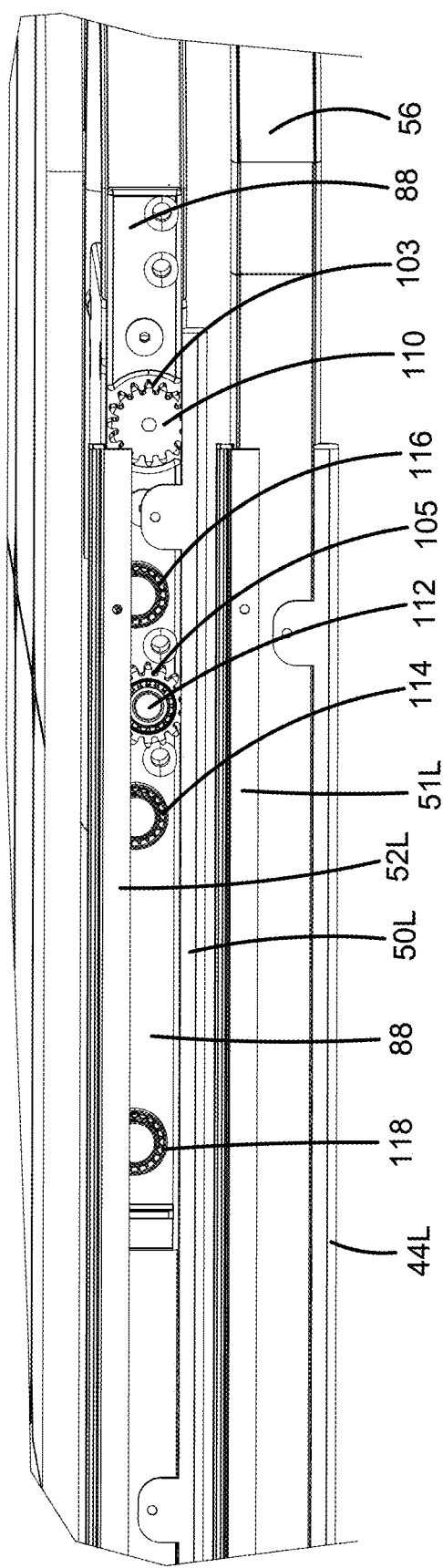
FIG. 18 is a left side perspective view of a portion of the solar panel assembly of FIG. 1 in the retracted position with the left side frame member removed for illustrative purposes.
Figure 19:
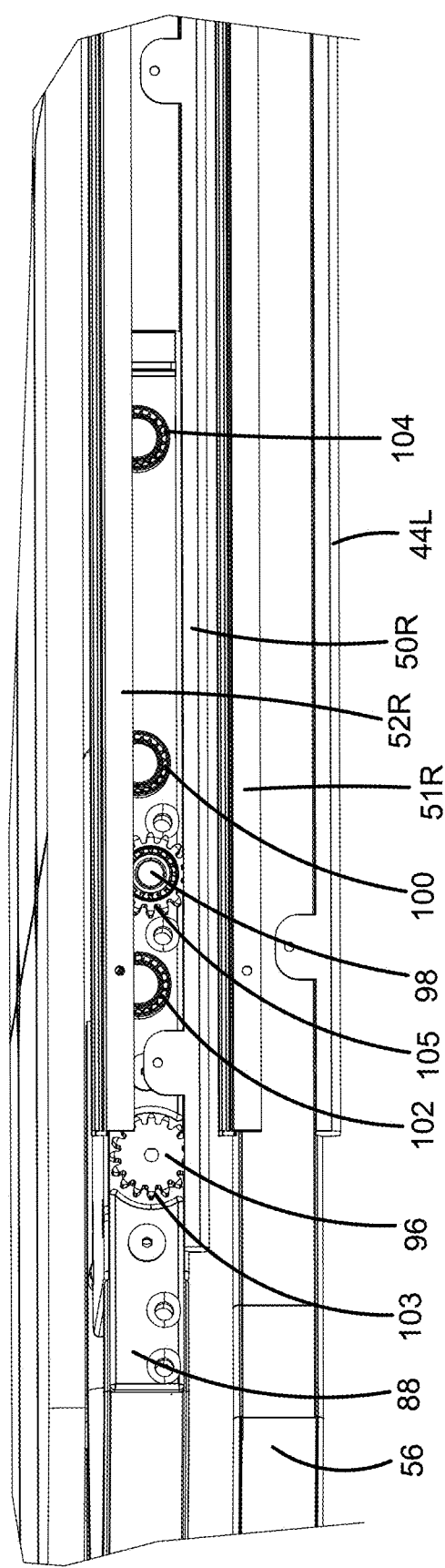
FIG. 19 is a right side perspective view of a portion of the solar panel assembly of FIG. 1 in the retracted position with the right side frame member removed for illustrative purposes.

Also, with reference to FIGS. 13-15, 18 and 19, in the retracted position, the rear solar panel 88 is inside the housing 22 with teeth 103, 105 (FIG. 19) of the third pinion gear 96 and the third roller bearing gear 98 in meshing engagement with the teeth 61 of the right upper rack 50R as seen in FIG. 19, and teeth 107, 117 (FIG. 18) of the fourth pinion gear 110 and the fourth roller bearing gear 112 in meshing engagement with the teeth 61 of the left upper rack 50L as seen in FIG. 18. In this retracted position also, the seventh, eighth, and ninth roller bearings 100, 102, 104 contact the right upper rail 52R as seen in FIG. 19 and the tenth, eleventh, and twelfth roller bearings 114, 116, 118 contact the left upper rail 52L as seen in FIG. 18.

The solar panel assembly 20 may be moved to an extended position as shown in FIGS. 3 and 6. In particular, the motors are energized to cause the rotors to rotate, which in turn rotates their respective pinon gears. For the front solar panel 56, the first and second pinion gears 64, 78 are rotated counterclockwise (as viewed from the right side of the solar panel assembly 20), which causes the front solar panel 56 to move forwardly out of the lower opening 109 at a predetermined distance after the first and second motors 60, 74 are energized. The first and second motors 69, 74 may be energized by a user pushing a push button on the vehicle or alternatively, inputs from a remote-control device or other portable device such as a cell phone. The solar panel assembly 20 may be configured such that the user may keep pushing the push button until the front solar panel 56 extends out at a selected distance at which the user can then release the push button to stop the movement of the front solar panel 56. The first and second roller bearing gears 66, 80 rotate counterclockwise freely and engage the right and left lower racks 44R, 44L to support the front solar panel 56 as it moves and reciprocates along the lower racks. Also, during this movement of the front solar panel 56, the first through sixth roller bearings maintain contact with their respective right and left lower rails 51R, 51L (see FIGS. 25 and 26) to keep the first and second pinion gears 64, 78 and first and second roller bearing gears 66, 80 in meshing engagement with the right and left lower racks 44R, 44L to prevent the front solar panel 56 from disengaging from the right and left lower racks 44R, 44L.

For the rear solar panel 88, the third and fourth pinion gears 96, 110 are rotated clockwise (as viewed from the right side of the solar panel assembly 20), which causes the rear solar panel 88 to move rearwardly out of the upper opening 111 at a predetermined distance after the third and fourth motors 92, 106 are energized. The third and fourth roller bearing gears 98, 112 rotate clockwise freely and engage the right and left upper racks 50R, 50L to support the rear solar panel 88 as it moves and reciprocates along the upper racks. Also, during this movement of the rear solar panel 88, the seventh through twelfth roller bearings maintain contact with their respective right and left upper rails 52R, 52L (see FIGS. 27 and 28) to keep the third and fourth pinion gears 96, 110 and third and fourth roller bear gears 98, 112 in meshing engagement with the right and left upper racks 50R, 50L to prevent the rear solar panel 88 from disengaging from the right and left upper racks 50R, 50L.

The third and fourth motors 92, 106 may be energized by a user pushing a push button on the vehicle or alternatively, by operating inputs from a remote control device or other portable device such as a cell phone. A pair of limiter switches 124 (FIGS. 7-10) may be provided on the rear end 131 of the front solar panel 56 and front end 133 of the rear solar panel 88 to stop the pinion gears 64, 78, 96, 110 rotation when the rear solar panel 88 or the front solar panel 56 is fully out in the extended position or fully in in the retracted position. Proximity sensors 134 (FIG. 3) may be provided at the rear end 135 of the rear solar panel 88 or front end 137 of the front solar panel 56 to stop the respective front or rear solar panel from sliding further if it will hit an obstacle such as a tree branch or pole detected by the proximity sensors 134. The solar panel assembly 20 may be configured such that the user may keep pushing the push button until the rear solar panel 88 extends out at a selected distance at which the user can then release the push button to stop the movement of the rear solar panel 88.

In the extended position more solar cells are exposed to sunlight. In addition to the solar cells 34 on top of the top solar panel 24 being exposed to sunlight, the solar cells 81, 93 on top of the front and rear solar panels 56, 88 are exposed to the sunlight. Thus, the solar cells can absorb more sunlight from the sun to generate more solar power to supply the electric vehicle. The front and rear solar panels 56, 88 also have solar cells 81, 93 on their bottoms that also absorb sunlight to provide additional power to supply the electric vehicle though not they are not directly exposed to the sun. The extended position is desirable for when the vehicle is parked and not being driven. The front and rear solar panels 56, 88 could use bifacial cells on the top and bottom sides that would be a lower cost implementation but produce less power. Strategically located drain holes 130 may be provided in the front and rear solar panels 56. 88 as shown in FIGS. 22 and 23.

The solar panel assembly 20 may be moved back to the retracted position, by pushing the same or a different button or by operating inputs from a remote-control device or other portable device such as a cell phone to energize the motors and cause the rotors to rotate in the opposite direction, which in turn rotates their respective pinon gears. For the front solar panel 56, the first and second pinion gears 64, 78 are rotated clockwise (as viewed from the right side of the solar panel assembly 20), which causes the front solar panel 56 to move rearwardly through the lower opening 109 and completely back into the housing 22. For the rear solar panel 88, the third and fourth pinion gears 96, 110 are rotated counterclockwise (as viewed from the right side of the solar panel assembly 20), which causes the rear solar panel 88 to move forwardly through the upper opening 111 and completely back into the housing 22. In the retracted position, the front and rear solar panels 56, 88 do not cover the front and rear windshield 127, 129 (FIG. 13) so as to not obscure the driver's and passenger's view through front and rear windshields 127, 129. This retracted position is desirable when the vehicle is being driven. Other suitable ways may be used to extend and retract the front and rear solar panels such as hydraulic, pneumatic, screw mount, or magnetic.

Figure 29:
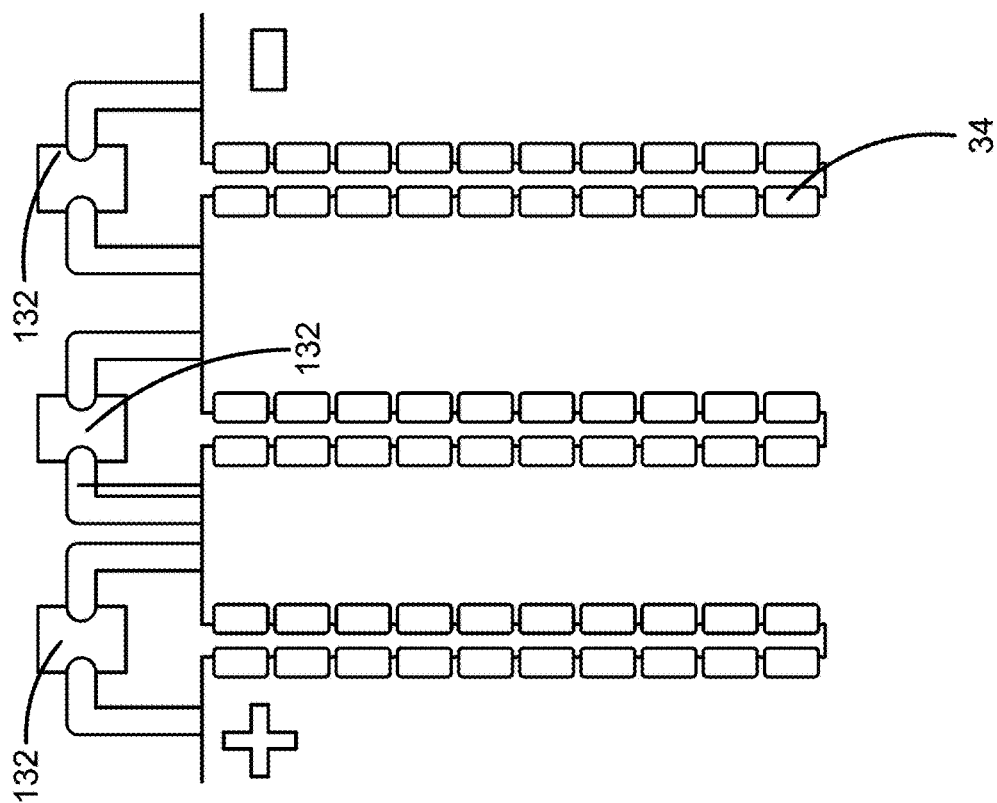
FIG. 29 is a schematic view of a solar cells coupled to cell level bypass diodes of the solar panel assembly of FIG. 1.

The solar panel assembly 20 may be configured so that the user has the option to extend the front solar panel 56 and keep the rear solar panel 88 retracted or extend the rear solar panel 88 and keep the rear solar panel 88 retracted. The solar panel assembly 20 could be wider and longer or smaller to adjust to different size cars as desired. The solar cells may be a variety of shapes such square or circular. The solar cells could be of any manufacturing technique or chemistry including but not limited to crystalline cells, amorphous cells, Silicone based cells, Gallium based cells, in form of a wafer, or thin film or in any other form. Also, cell level bypass diodes 132 may be provided as illustrated in FIG. 29. Cell level bypass diodes 132 operate as follows. If there is any single or random sets of solar cells 34 that receive a shadow, or are covered with an object such as snow, bird dropping or leaves, the cell level bypass diodes enable only those covered solar cells to be bypassed and the rest of the uncovered solar cells will continue to work and supply power. Alternatively, string level or even cell level MPPT (Maximum power point transfer) may also be used instead of cell level bypass diodes. This will allow the weaker panel, string or solar cell to generate power instead of being bypassed as the MPPT extracts maximum power point from the respective panel, string or solar cell.

Figure 21:
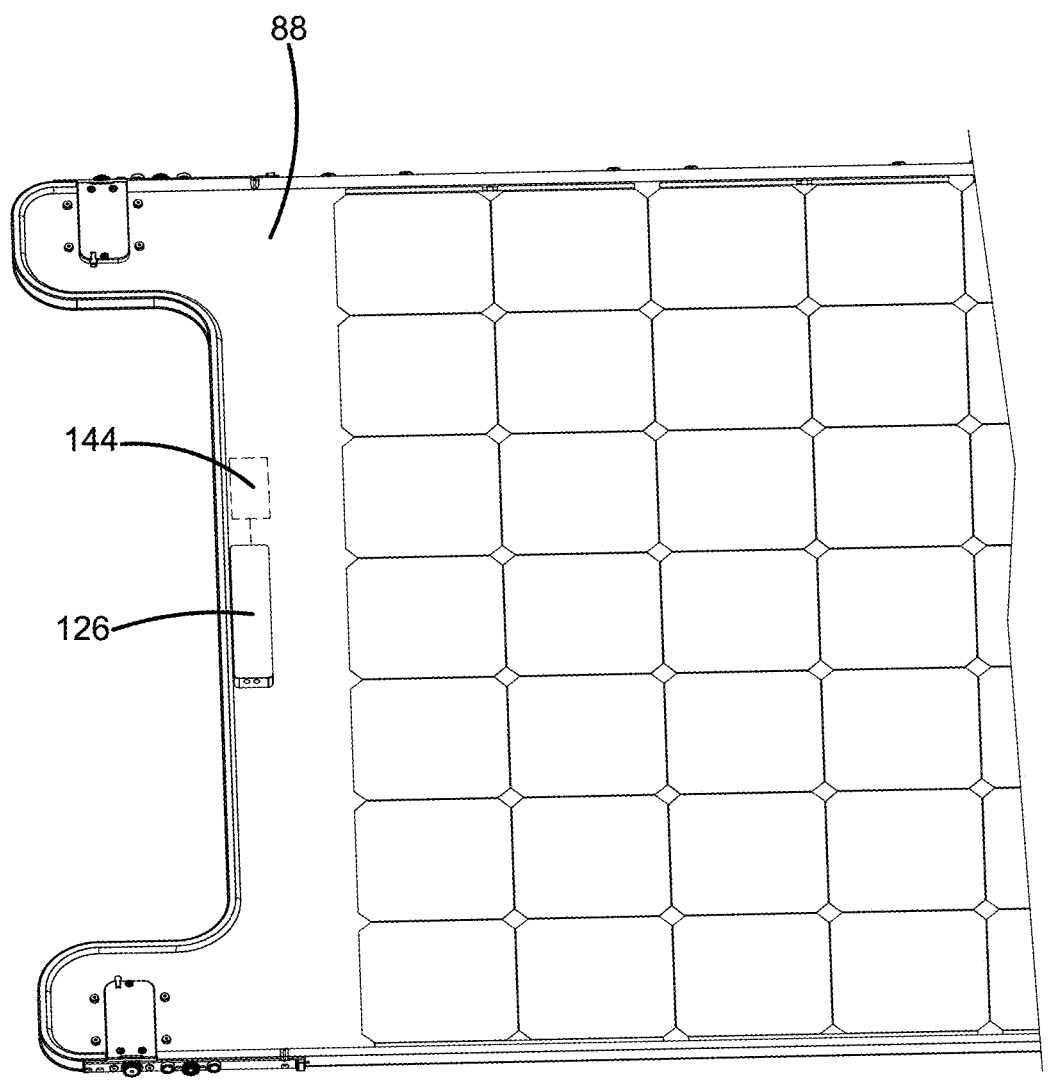
FIG. 21 is a top and left side perspective view of a front portion of the rear solar panel of the solar panel assembly of FIG. 1.
Figure 30:
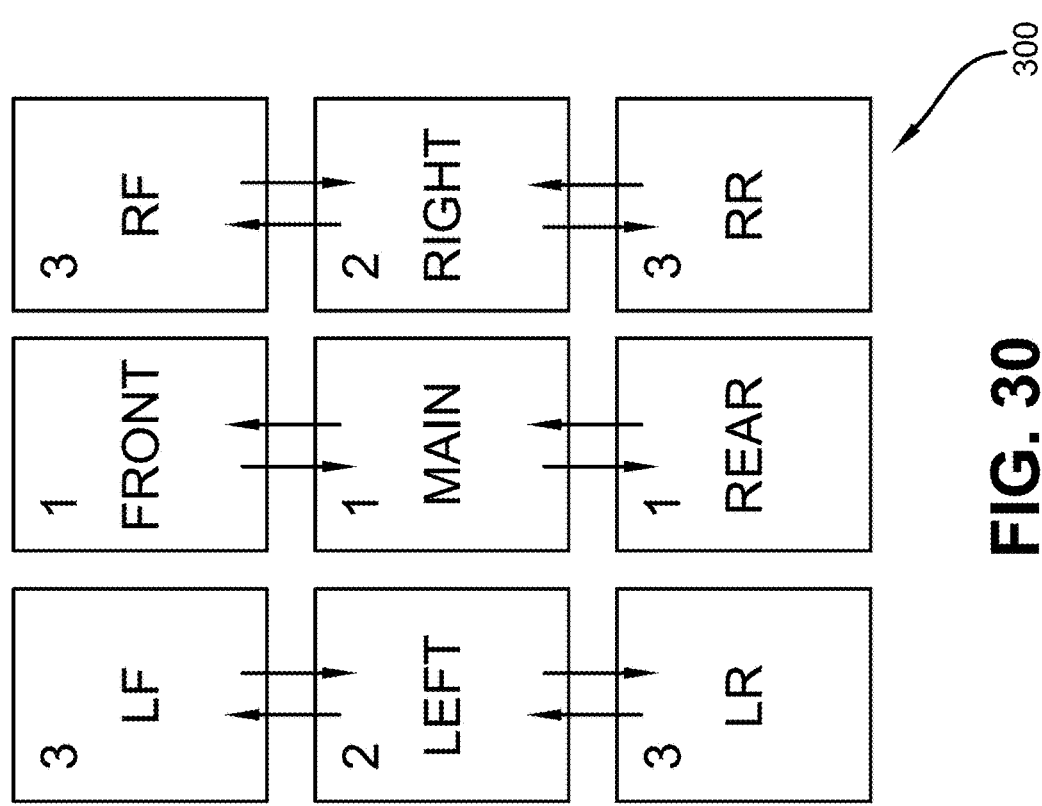
FIG. 30 is a top view of another embodiment of the solar panel assembly of the present invention.

In an alternative version, highly flexible thin film solar panels made of amorphous, crystalline or any solar technology maybe rolled or wound up and unwound instead of sliding in and out of the housing 22. As seen in FIGS. 20 and 21, a junction box 126 may be provided in each of the solar panels 56, 88 from which the wires come out to connect to an inverter 140 housed in the bottom cover or tray. There are physical cells on front and back of the slider. One could use bifacial solar cells (cells that produce power from both front and back), which reduces cost even though they a significant drop in generation from the back. Alternatively, solar cells may be located only on the top sides of the front and rear solar panels 56, 88. In another embodiment as shown in FIG. 30, the solar panel assembly 300 may have another set of six solar panels. In particular, three solar panels may slide out from the right side of the housing and three solar panels may slide out from the left side of the housing. Then, for each group of three solar panels when extended, one panel may slide forwardly and another panel may slide rearwardly. Various combinations of panels may slide out. For example, in a first phase, the front and rear solar panels slide out from top or main solar panel. In a second phase, the right group, left group, front and rear solar panels slide out from the main solar panel. In a third phase, the right group, left group, front and rear solar panels slide out from the main solar panel, the left front and left rear solar panels slide out from the left solar panel, and the right front and right rear solar panels slide out from the right solar panel. Alternatively, the two groups of three solar panels may slide out from the main solar panel at the front and rear instead of the right and left. So, in the third phase, the front group, rear group, right and left solar panels slide out from the main solar panel, the left front and right front solar panels slide out from the front solar panel, and the right rear and left rear solar panels slide out from the rear solar panel. All of the other components of the second embodiment are similar in structure and function as that of the first embodiment of the present invention.

Figure 24:
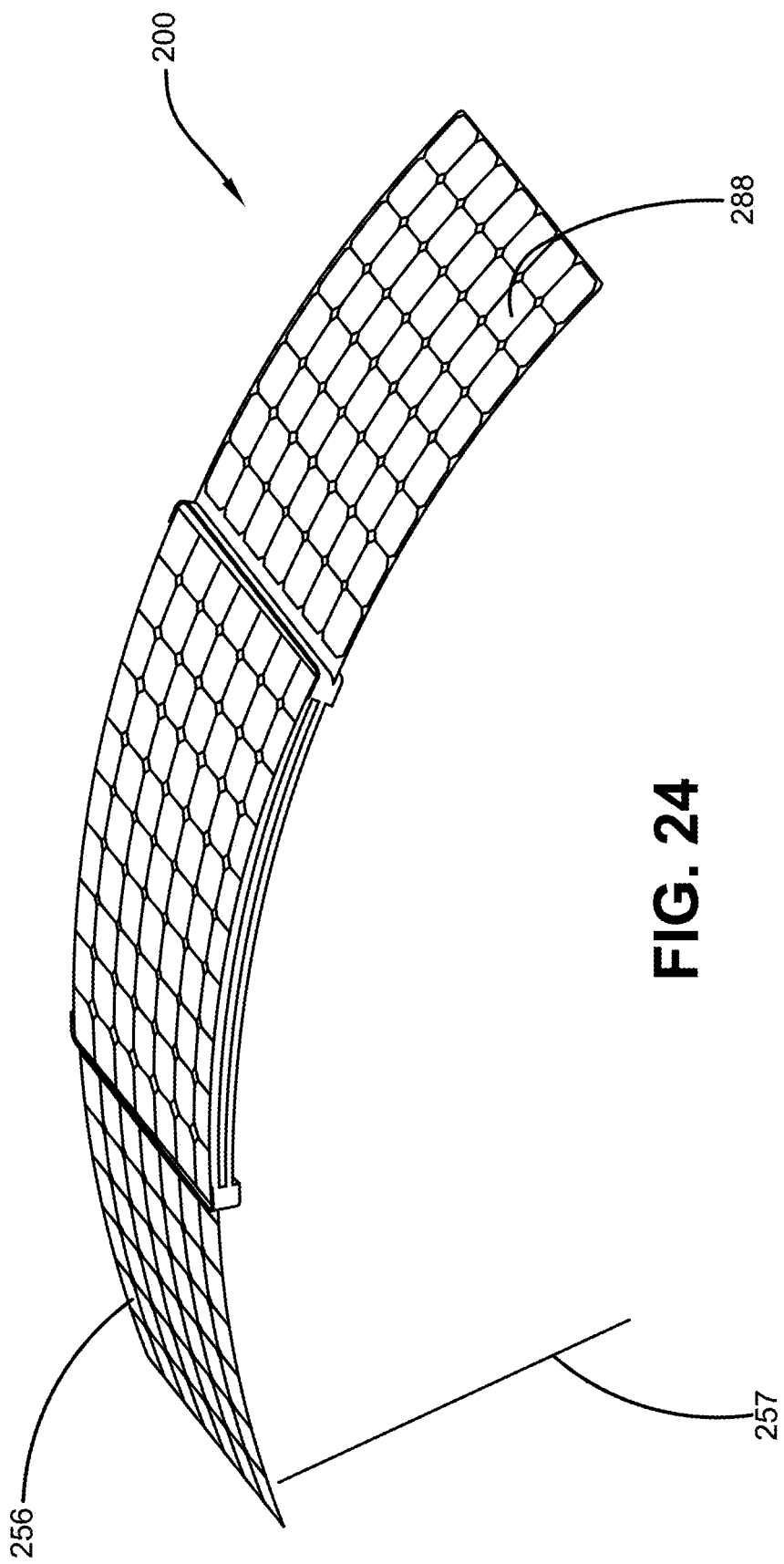
FIG. 24 is a top and left side perspective view of the solar panel assembly in the extended portions according to a second embodiment of the present invention.

FIG. 24 shows a second embodiment of the present invention in the extended position in which the solar panel assembly 200 is convexly curved to correspond to the shape of the roof and front and rear windshields of the vehicle. In the extended position, the front solar panel 256 is also convexly curved to correspond to the shape of the front windshield, and rear solar panel 288 is convexly curved to correspond to the shape of the rear windshield. This makes the solar panel assembly more aesthetically appealing and enhanced aerodynamics. The right and left upper and lower racks, rails, and side frame members are similar in structure and function to that of the first embodiment except that they are convexly curved. All of the other components of the second embodiment are similar in structure and function as that of the first embodiment of the present invention. In all embodiments, there may be a front catch or gripping mechanism 257 that grips the front end of the front solar panel and a rear catch of gripping mechanism that grips the rear end of the real solar panel to stabilize them and prevent them flapping in the wind. In alternative versions, the solar panel may be part of the roof of the vehicle.

An AC 110V waterproof socket 136 (schematically shown in FIG. 3) is added to the solar panel assembly 20 to enable an existing electric vehicle charger to plug in it to charge the electric vehicle, or plug in two electric vehicle chargers and charge two cars at half the rate, or use the socket to charge electric vehicles and also use the power for homes in case of power outages or use the socket to power a camping battery. The solar panel assembly 20 may have a tracking system attached to it at the back allowing solar modules to track the sun. The solar panel assembly 20 may tilt partially or fully toward the sun. This would increase the generation by thirty percent for single axis tilt and forty percent for dual axis tilt. The solar panel assembly 20 may be configured to allow charging by hot wiring the solar panel assembly 20 to the electric vehicle at a service center. An adaptation kit may be included that will allow the solar panel assembly 20 to charge the electric vehicle from the top solar panel 24 without sliding out the front and rear solar panels 56, 88 even when the electric vehicle is driving or charging the car with the front and rear solar panels 56, 88 extended when the electric vehicle is parked at a parking lot without physically plugging in the electric vehicle. The rails may be made of nylon or other suitable low friction type material. In both embodiments, the solar panel assembly 20 may be turned horizontally 180 degrees and mounted on the vehicle such that the upper opening 111 is located at the front of the solar panel assembly 20 and the lower opening 109 is located at the rear of the solar panel assembly 20.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above-described embodiments, method, and examples, but by all embodiments and methods within the scope and spirit of the invention.

What is claimed is:

1. A solar panel assembly for a vehicle comprising:
   a housing, wherein the housing comprises a top solar panel, a bottom cover panel, first and second opposite side frame members, and third and fourth opposite side frame members; and
   a first movable solar panel, wherein the first movable solar panel is movable between a first solar panel retracted position located inside the housing and a first solar panel extended position extending from out of the housing; and
   a first rack, wherein the first rack is mounted on the third side frame member, wherein the first movable solar panel includes a first pinion gear and a rotatable first roller bearing gear, wherein the first pinion gear has first pinion gear teeth in meshing engagement with first rack teeth of the first rack, wherein the first roller bearing gear has first roller bearing gear teeth in meshing engagement with the first rack teeth.

2. The solar panel assembly of claim 1 further comprising a second movable solar panel, wherein the second movable solar panel is movable between a second solar panel retracted position located inside the housing and a second solar panel extended position extending from out of the housing.

3. The solar panel assembly of claim 2, wherein the first movable solar panel is configured to extend from the first side frame member of the housing in the first solar panel extended position, wherein the second movable solar panel is configured to extend from the second side frame member of the housing in the second solar panel extended position.

4. The solar panel assembly of claim 1 further comprising a second rack, wherein the second rack is mounted on the fourth side frame member, wherein the first movable solar panel has a second pinion gear, wherein the first and second pinion gears are rotatably connected to the first movable solar panel on opposite first and second sides of the first movable solar panel, wherein the second pinion gear has second pinion gear teeth that are in meshing engagement with second rack teeth of the second rack.

5. The solar panel assembly of claim 4, further comprising a first motor, wherein the first motor is in operative connection with the first pinion gear, wherein the first motor is operative to cause rotation of the first pinion gear in a first direction to help move the first movable solar panel along the first and second racks from the first solar panel retracted position to the first solar panel extended position.

6. The solar panel assembly of claim 5 further comprising a second motor, wherein the second motor is in operative connection with the second pinion gear, wherein the second motor is operative to cause rotation of the second pinion gear in the first direction to help move the first movable solar panel along the first and second racks from the first solar panel retracted position to the first solar panel extended position.

7. The solar panel assembly of claim 6 further comprising a second roller bearing gear, wherein the first roller bearing gear is rotatably mounted to the first side of the first movable solar panel frame, wherein the second roller bearing gear is rotatably mounted to the second side of the first movable solar panel frame and has second roller bearing teeth that are in meshing engagement with the second rack teeth.

8. The solar panel assembly of claim 4 further comprising first and second rails, wherein the first rail is mounted on the third side frame member and the second rail is mounted on the fourth side frame member, wherein the first movable solar panel has a second roller bearing, wherein first and second roller bearings are rotatably connected to the first movable solar panel on the opposite first and second sides of the first movable solar panel, wherein the first roller bearing rotatably engages the first rail and the second roller bearing rotatably engages the second rail as the first movable solar panel moves between the first solar panel retracted position and the first solar panel extended position.

9. The solar panel assembly of claim 4 further comprising a second movable solar panel, wherein the second movable solar panel is movable between a second solar panel retracted position located inside the housing and a second solar panel extended position extending from out of the housing, wherein the first movable solar panel is configured to extend from the first side frame member of the housing in the first solar panel extended position, wherein the second movable solar panel is configured to extend from the second side frame member of the housing in the second solar panel extended position, wherein the second movable solar panel has third and fourth pinion gears rotatably connected to the second movable solar panel on opposite third and fourth sides of the second movable solar panel, wherein third pinion gear has third pinion gear teeth that are in meshing engagement with the first rack teeth of the first rack, wherein the fourth pinion gear has fourth pinion gear teeth that are in meshing engagement with the second rack teeth of the second rack.

10. The solar panel assembly of claim 9 further comprising:
    a second roller bearing gear, wherein the first roller bearing gear is rotatably mounted to the first side of the first movable solar panel frame, wherein the second roller bearing gear is rotatably mounted to the second side of the first movable solar panel frame and has second roller bearing teeth that are in meshing engagement with the second rack teeth; and
    third and fourth roller bearing gears, wherein the third roller bearing gear is rotatably mounted to the third side of the second movable solar panel frame and has third roller bearing teeth that are in meshing engagement with the first rack teeth, wherein the fourth roller bearing gear is rotatably mounted to the fourth side of the second movable solar panel frame and has second roller bearing teeth that are in meshing engagement with the second rack teeth.

11. The solar panel assembly of claim 9, further comprising a first motor, wherein the first motor is in operative connection with the first pinion gear, wherein the first motor is operative to cause rotation of the first pinion gear in a first direction to help move the first movable solar panel along the first and second racks from the first solar panel retracted position to the first solar panel extended position.

12. The solar panel assembly of claim 11, further comprising a second motor, wherein the second motor is in operative connection with the third pinion gear, wherein the second motor is operative to cause rotation of the third pinion gear in a second direction to help move the second movable solar panel along the first and second racks from the second solar panel retracted position to the second solar panel extended position.

13. The solar panel assembly of claim 12, further comprising:
   a third motor, wherein the third motor is in operative connection with the second pinion gear, wherein the third motor is operative to cause rotation of the second pinion gear in a first direction to help move the first movable solar panel along the first and second racks from the first solar panel retracted position to the first solar panel extended position; and
   a fourth motor, wherein the fourth motor is in operative connection with the fourth pinion gear, wherein the fourth motor is operative to cause rotation of the fourth pinion gear in a second direction to help move the second movable solar panel along the first and second racks from the second solar panel retracted position to the second solar panel extended position.

14. The solar panel assembly of claim 13 further comprising:
   a second roller bearing gear, wherein the first roller bearing gear is rotatably mounted to the first side of the first movable solar panel frame, wherein the second roller bearing gear is rotatably mounted to the second side of the first movable solar panel frame and has second roller bearing teeth that are in meshing engagement with the second rack teeth; and
   third and fourth roller bearing gears, wherein the third roller bearing gear is rotatably mounted to the third side of the second movable solar panel frame and has third roller bearing teeth that are in meshing engagement with the first rack teeth, wherein the fourth roller bearing gear is rotatably mounted to the fourth side of the second movable solar panel frame and has second roller bearing teeth that are in meshing engagement with the second rack teeth.

15. The solar panel assembly of claim 14 further comprising:
   first and second rails, wherein the first rail is mounted on the third side frame member and the second rail is mounted on the fourth side frame member, wherein the first movable solar panel has first and second roller bearings rotatably connected to the first movable solar panel on the opposite first and second sides of the first movable solar panel, wherein the first roller bearing rotatably engages the first rail and the second roller bearing rotatably engages the second rail as the first movable solar panel moves between the first solar panel retracted position and the first solar panel extended position, wherein the second movable solar panel has third and fourth roller bearings rotatably connected to the second movable solar panel on the opposite third and fourth sides of the second movable solar panel, wherein the third roller bearing rotatably engages the first rail and the fourth roller bearing rotatably engages the second rail as the second movable solar panel moves between the second solar panel retracted position and the second solar panel extended position.

* * * * *